US 8,531,930 B2

(12) United States Patent
Yamazaki

(10) Patent No.: US 8,531,930 B2
(45) Date of Patent: Sep. 10, 2013

(54) OPTICAL PICKUP DEVICE AND OPTICAL DISC APPARATUS

(75) Inventor: Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 16 days.

(21) Appl. No.: 13/071,575

(22) Filed: Mar. 25, 2011

(65) Prior Publication Data

US 2012/0057445 A1 Mar. 8, 2012

(30) Foreign Application Priority Data

Sep. 3, 2010 (JP) ................................. 2010-197344

(51) Int. Cl.
*G11B 7/00* (2006.01)
*G11B 5/58* (2006.01)
*G11B 5/55* (2006.01)
*G11B 7/135* (2006.01)

(52) U.S. Cl.
USPC ................. 369/53.28; 369/112.04; 369/53.27; 369/53.22; 369/44.41; 369/124.12; 369/109.01; 369/109.02; 369/110.03; 369/112.03; 369/112.07; 369/112.12

(58) Field of Classification Search
USPC ............... 369/53.28, 112.04, 112.08, 112.13, 369/112.2, 112.23, 112.24, 109.01, 109.02, 369/110.03, 112.03, 112.07, 112.12, 124.12, 369/44.41, 53.22, 53.27
See application file for complete search history.

(56) References Cited

U.S. PATENT DOCUMENTS

| | | | | |
|---|---|---|---|---|
| 2001/0024418 | A1* | 9/2001 | Nakamura et al. | 369/112.28 |
| 2005/0161579 | A1 | 7/2005 | Kim et al. | |
| 2005/0199778 | A1 | 9/2005 | Kadowaki et al. | |
| 2006/0158996 | A1* | 7/2006 | Kim | 369/112.03 |
| 2008/0094949 | A1* | 4/2008 | Kamisada et al. | 369/44.11 |
| 2008/0198730 | A1* | 8/2008 | Mori et al. | 369/112.23 |
| 2009/0185471 | A1 | 7/2009 | Yamazaki | |
| 2010/0142355 | A1* | 6/2010 | Katayama | 369/112.04 |

FOREIGN PATENT DOCUMENTS

| | | |
|---|---|---|
| JP | 2004-281026 | 10/2004 |
| JP | 2005-203090 | 7/2005 |
| JP | 2009-9617 | 1/2009 |
| JP | 2009-170060 | 7/2009 |
| WO | WO 2007/043579 A1 | 4/2007 |

OTHER PUBLICATIONS

Kousei Sano et al., Novel One-beam Tracking Detection Method for Dual-Layer Blu-ray Discs, IEICE Technical Report, 2005, p. 31-34.

* cited by examiner

*Primary Examiner* — Aneeta Yodichkas
(74) *Attorney, Agent, or Firm* — Antonelli, Terry, Stout & Kraus, LLP.

(57) ABSTRACT

For obtaining stable servo-signals without receiving ill influences of stray lights from other layers, on both a focus error signal and a tracking error signal, when recording/reproducing a multi-layer optical disc having small gap between layers thereof, a light beam is divided with using a first and a second diffraction gratings. The first diffraction grating is a polarization diffraction grating, and is mounted on an actuator. The second diffraction grating is disposed on a fixed portion. The first diffraction grating has a first region having a center of a light beam and other(s), and among signal lights reflecting from the disc, the light beam entering into the first region is diffracted, and the light beam entering into the second region transmits therethrough. The second diffraction grating transmits the light beam diffracting on the first region of the polarization diffraction grating therethrough, while diffracting the light beam diffracting on the second region.

21 Claims, 23 Drawing Sheets

OPTICAL PICKUP DEVICE AND OPTICAL DISC APPARATUS

This application relates to and claims priority from Japanese Patent Application No. 2010-197344 filed on Sep. 3, 2010, the entire disclosure of which is incorporated herein by reference.

BACKGROUND OF THE INVENTION

The present invention relates to an optical pickup device and an optical disc apparatus, for recording/reproducing information onto/from an information recording medium having plural numbers of information recording surfaces.

As the background art is already known, for example, Japanese Patent Laying-Open No. 2005-203090 (Patent Document 1). In that publication, as a problem(s) to be dissolved, there is a description, "It is to provided an optical pickup for enabling to restrain coherent light because of a neighboring layer, when recording and/or reproducing a multi-layer disc having plural numbers of recording layers on one side surface thereof, and thereby improving a jitter of a tracking error signal, which is detected by a DPP (Differential-Push-Pull).", and also is made a description, as a dissolving means, "It has an optical member for restraining the coherent light because of the neighboring layer from being received by a photo detector, when applying to an optical information reservation medium having plural numbers of recording layers on one surface. With this, it is possible to restrain the coherent light because of the neighboring layer from being received by the photo detector, in particular, first and second sub-photo detectors of the photo detector."

Also, for example, in Non-Patent Document 1 is descried, as the problem to be dissolved, "When recording/reproducing a 2-layer disc, an offset is generated in a TE signal if another-layer stray light, including a light reflecting on a layer differing from a target layer, enters into a photo detector. For this reason, within the conventional structure without a countermeasure against the another-layer stray light, the offset of the TE signal on the 2-layer disc comes to be large, comparing to that in case of a single layer, and therefore a stable control is disturbed.", and also, as the dissolving means is mentioned, "The photo detector for use of tracking is disposed in a region where no another-layer stray light enters." And, the structures for that are also described in Japanese Patent Laying-Open NO. 2004-281026 (Patent Document 2).

Also, in the abstract of Japanese Patent Laying-Open No. 2009-170060 (Patent Document 3), as an object thereof, i.e., "to provide an optical pickup device for enabling to obtain a stable servo signal, without receiving ill influences of the stray light from other layer(s), as well as, a focus error signal and a tracking error signal, when recording/reproducing the multi-layer disc", it is described that "A reflection light from the multi-layer disc is divided into a plural number of regions, wherein a light flux divided forms a focus at a different position on the photo detector, and at the same time, the focus error signal is detected through a knife-edge method with using a plural number of light fluxes; thereby detecting the tracking error signal with using the plural numbers of light fluxes divided. Further, when the focus is fit to the target layer, a divided region and a light receiving surface are disposed, so that no stray light from other layer(s) enters into a light receiving surface for use of the servo signal of the photo detector."

PRIOR ART DOCUMENTS

Patent Documents

[Patent Document 1] Japanese Patent Laying-Open No. 2005-203090 (2005);
[Patent Document 2] Japanese Patent Laying-Open No. 2004-281026 (2004); and
[Patent Document 3] Japanese Patent Laying-Open No. 2009-170060 (2009), Non-Patent Documents

[Non-Patent Document 1] Electronic Information Communication Academic Society Bulletin CPM 2005-149 (2005-10).

BRIEF SUMMARY OF THE INVENTION

The optical pickup device, in general, for the purpose of correctly irradiating a spot, correctly, on a predetermined recording track within the optical disc, detects the tracking error signal, so as to shift an objective lens into a disc radius direction (i.e., a Rad Direction), thereby achieving a tracking adjustment, other than conducting an adjustment in a focus direction while shifting the objective lens in a focus direction through detection of the focus error signal. With those signals, position control of the objective lens can be executed.

Among those servo signals, in particular, the tracking error signal has a large problem when being applied onto the multi-layer disc, which is constructed with two (2) or more numbers of recording layers. With the multi-layer disc, other than a signal light reflecting on the target layer, the stray lights reflecting on plural numbers of recording layers other than that target enters into the same light receiving parts. Thus, when the signal light and the stray lights enter into the light receiving parts, then two (2) light beams interfere with each other, and a fluctuating component thereof is detected within the tracking error signal.

For such problem, the Patent Document 1 proposes the structures for diffracting a part of the light beams reflecting from the multi-layer disc, and thereby prohibiting the stray lights from entering into the light receiving parts. However, if a distance between the layers comes to be small, then there is a necessary of making the region of a diffraction grating large, accompanying with this; i.e., such structures of the Patent Document 1 stall has a problem that both an escape from the stray light and detection of the servo signal cannot be obtained with that.

Also, with the Non-Patent Document 1 (and, the Patent Document 2), the light receiving parts for use of detection of the tracking error signal is disposed in an outside of the stray light(s) from other layer(s) of the light beam for user of focus, which is/are generated in periphery of the light receiving parts for use of detection of the focus error signal. With such structure, since it depends on a gap or distance defined between the furthermost layer from a disc surface and the nearest layer thereto, then position of the light receiving parts for use of detection of the tracking error signal comes to be away from the light receiving parts for use of detection of the focus error signal if applied onto the multi-layer disc, and there is/are generated a problem of sizes of the pickup device accompanying with large-sizing of the photo detector and/or a problem of cost thereof.

According to the present invention, an object thereof is to provide an optical pickup device for obtaining a stable servo signal, when recording/reproducing an information recording medium having plural numbers of information recording surfaces, as well as, enabling a compact sizing, and also an optical disc apparatus installing this.

The object mentioned above is accomplished by an invention, which is described in the claims, which will be mentioned below, for example.

According to the present invention, it is possible to provide the optical pickup device for obtaining a stable servo signal, when recording/reproducing an information recording medium having plural numbers of information recording surfaces, as well as, enabling a compact sizing, and also the optical disc apparatus installing this thereon.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings, however, the present invention should not be restricted only to those, which will be mentioned below.

Embodiment 1

Figure 1:
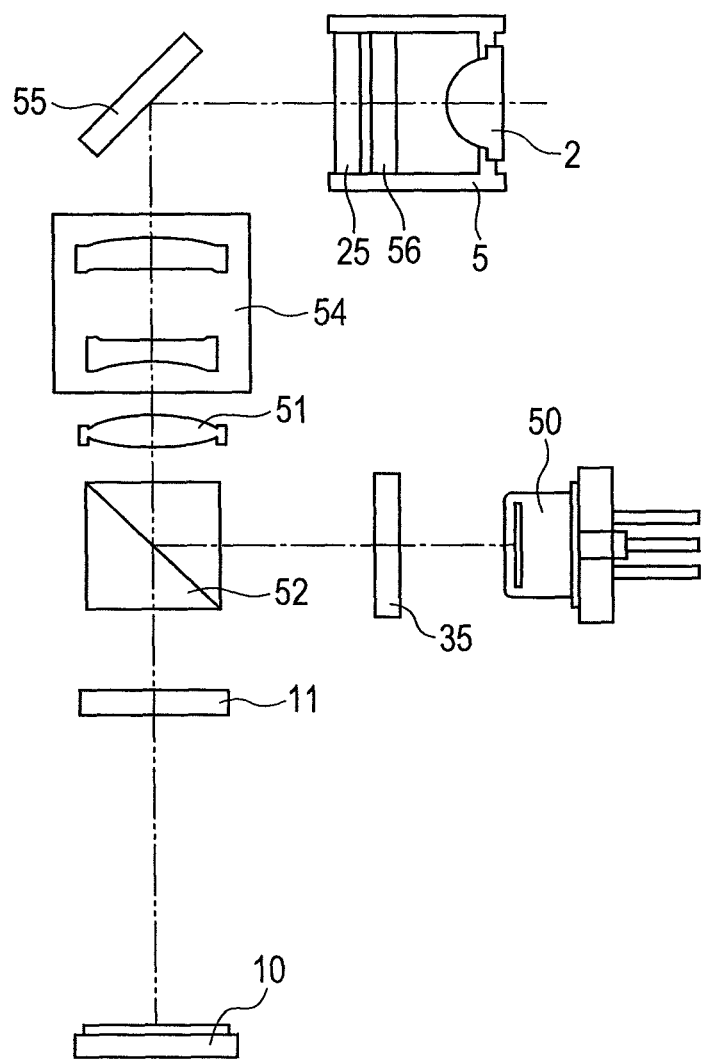
FIG. 1 is a view for explaining an optic system, according to an embodiment 1 of the present invention.

FIG. 1 shows an optic system of an optical pickup device, according to a first embodiment of the present invention. Herein, explanation will be given on a BD (Blu-ray Disc); however, it may be of other recording method. But, in the explanation, which will be given hereinafter, a layer of an optical disc includes a recording layer on a recordable-type and a reproducing layer on an optical disc for exclusive use of reproducing.

From a laser diode 50 is emitted a P-polarized light beam having wavelength of about 405 nm, as a divergent light. The P-polarized light beam emitting from the laser diode 50 is converted into a S-polarized light beam on a half wave plate 35. The S-polarized light beam is reflected on a polarization beam splitter 52. The light beam reflecting upon the polarization beam splitter 52 is converted into a nearly parallel light beam by a collimating lens 51. The light beam transmitting the collimating lens 51 enters into a beam expander 54. The beam expander 54 changes a divergence/convergence condition of the light beam, and thereby is used for compensating a spherical aberration due to an error of thickness of a cover layer of the optical disc. The light beam emitting from the beam expander 54 is reflected on a reflection mirror 55, and is focused on the optical disc, passing through a polarization diffraction grating 25, a quarter wave plate 56 and a objective lens 2, which are mounted on an actuator 5. In this instance, the polarization diffraction grating 25 has a characteristic of causing a diffraction function upon the P-polarized light beam, but not cause the diffraction function upon the S-polarized light beam. Also, by means of the quarter wave plate 56, since the S-polarized light beam is emitted in the form of a circular polarized light beam, then one (1) spot of the circular polarized light is formed on the disc.

Figure 2:
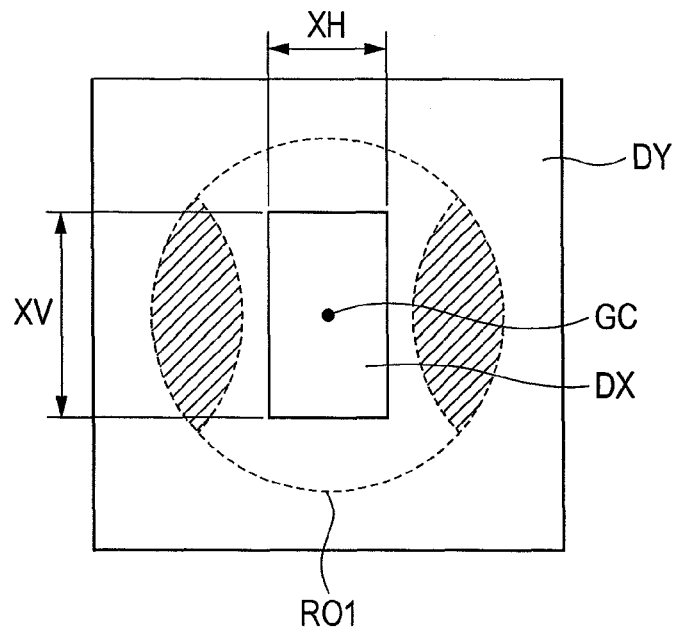
FIG. 2 is a view for showing a relationship between a pattern of a polarization diffraction grating and a light beam on the polarization diffraction grating according to the embodiment 1.

The circular polarized light beam reflecting on the optical disc enters into the objective lens 2 and the quarter wave plate 56. In this instance, by means of the quarter wave plate 56, the circular polarized light beam is converted into the P-polarized light beam. The P-polarized light beam enters into the polarization diffraction grating 25. FIG. 2 is view for showing a pattern of the polarization diffraction grating 25. Herein, a point GC in FIG. 2 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY, wherein the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $-1^{st}$ dimensional diffraction light=1:0:1. Also, the P-polarized light beam entering in the region DY transmits therethrough, or emits therefrom as the $0^{th}$ dimensional diffraction light.

Figure 3:
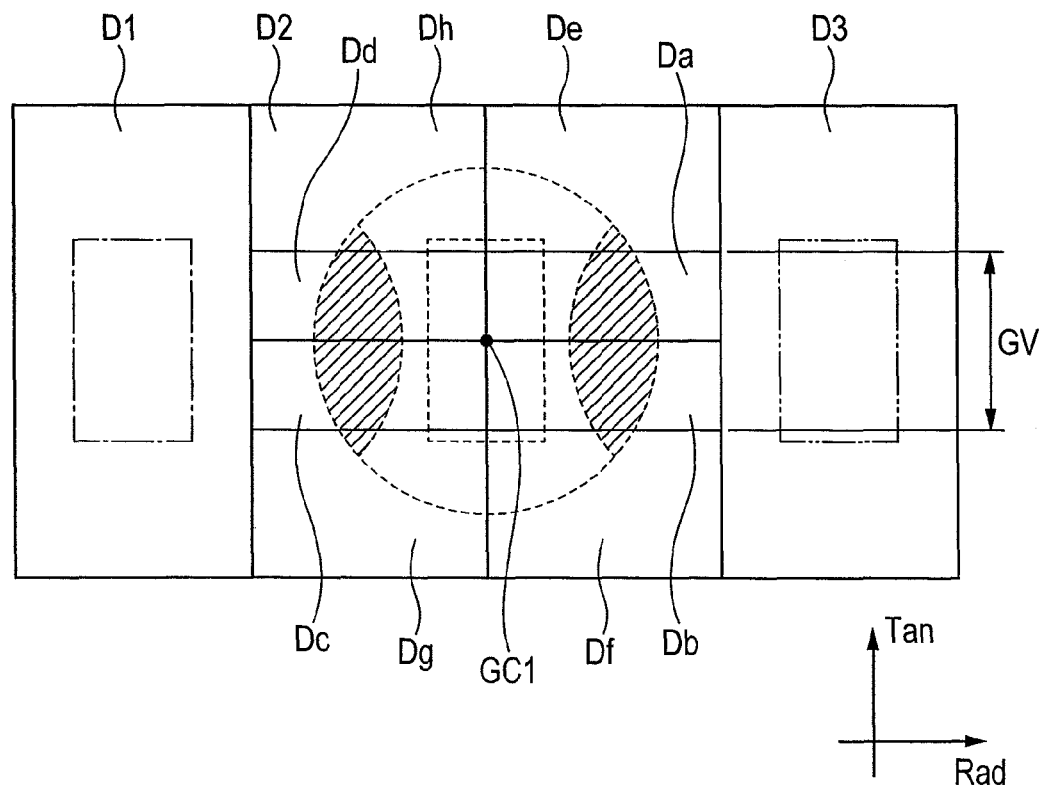
FIG. 3 is a view for showing a relationship between a pattern of a diffraction grating and a light beam on the diffraction grating according to the embodiment 1.

The light beam emitting from the polarization diffraction grating 25, after passing through the reflection mirror 55, the beam expander 54, the collimating lens 51 and the beam expander 52, enters into a diffraction grating 11. FIG. 3 is a view for showing a pattern of the diffraction grating 11. Herein, a dotted line in FIG. 3 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively. The diffraction grating 11 can be divided, roughly, into regions D1, D2 and D3. And, the region D2 can be divided into regions Da, Db, Dc, Dd, De, Df, Dg and Dh. Each of regions can be divided, depending on diffracted lights of the disc, and they can be divided into Da, Db, Dc and Dd (i.e., a diffraction grating region B) where the $\pm 1^{st}$ dimensional diffraction lights of the disc enter into, De and Dh (i.e., a diffraction grating region A) where the $0^{th}$ dimensional diffraction light of the disc enters into, and Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Da, Db, Dc, Dd, De, Df, Dg or Dh. Herein, for example, it is assumed that a diffraction efficiency of the region D2 is $+1^{st}$ dimensional diffraction light: $0^{th}$ dimensional diffraction light: $-1^{st}$ dimensional diffraction light=7:0:3.

Figure 4:
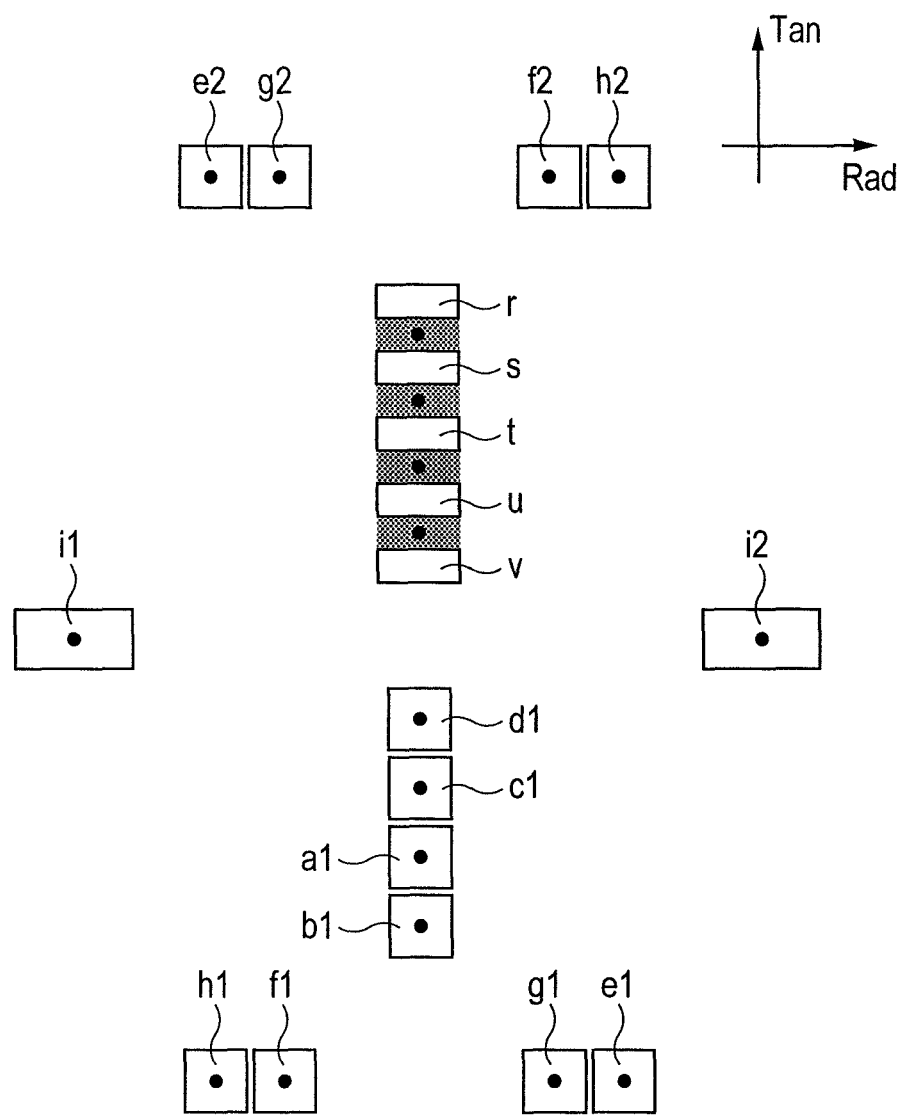
FIG. 4 is a view for showing an arrangement of light receiving parts of a photo detector according to the embodiment 1.

The light beam emitting from the diffraction grating 11 enters into light receiving parts of a photo detector 10. In FIG. 4 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The $+1^{st}$ dimensional diffraction light and the $-1^{st}$ dimensional diffraction light of the region DX of the polarization diffraction grating 25 enter into the light receiving parts i1 and i2. Also, the $+1^{st}$ dimensional diffraction light, entering into the region DY of the polarization diffraction grating 25 and diffracting on the regions Da, Db, Dc, Dd, De, Df, Dg and Dh of the diffraction grating 11, enters into the light receiving parts a1, b1, c1, d1, e1, f1, g1 and h1. Also, $-1^{st}$ dimensional diffraction light diffracting on the regions Da, Db, Dc and Dd enters into dark line portions of the light receiving portions r, s, t, u and v for use of detection of focus error signal, and $-1^{st}$ dimensional diffraction light diffracting on the regions De, Df, Dg and Dh enters into the light receiving portions e2, f2, g2 and h2, respectively.

The focus error signal (FES), the tracking error signal (TES) and RF signal (RF) are produced by executing the following operation upon signals A1, B1, C1, D1, E1, F1, G1, H1, E2, F2, G2, H2, R, S, T, U, V, I1, and I2, which are obtained from the light receiving parts a1, b1, c1, d1, e1, f1, g1, h1, e2, f2, g2, h2, r, s, t, u, v, i1 and i2.

$$FES=(R+T+V)-(S+U)$$

$$TES=\{(A1+B1)-(C1+D1)\}-k\times\{(E1+E2+F1+F2)-(G1+G2+H1+H2)\}$$

$$RF=A1+B1+C1+D1+E1+F1+G1+H1+I1+I2 \quad \text{(Eq. 1)}$$

Also, relating to the tracking detection method, the following operation may be applied:

$$TES=\{(A1+E1+B1+F1)-(C1+G1+D1+H1)\}-k\times\{(E2+F2)-(G2+H2)\}$$

Further, k is a coefficient for not generating a DC component in the tracking error signal when shifting the objective lens. Herein, a focus error detection method is a knife-edge detection method.

Figure 5A:
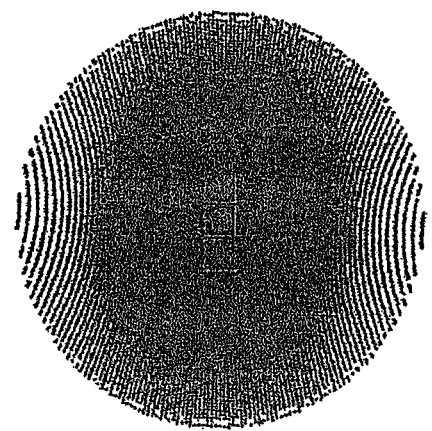
FIGS. 5A and 5B are views for showing a signal light and a stray light on the photo detector, when recording/reproducing a disc of the conventional type, having a large gap between the layers, according to the embodiment 1.
Figure 5B:
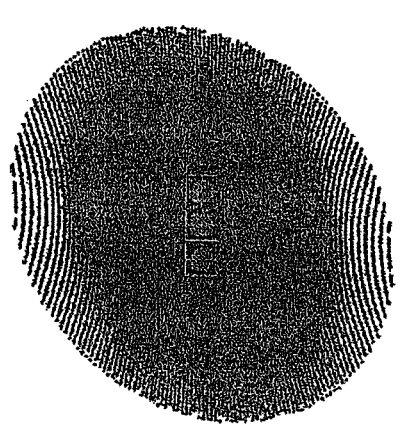

Herein, detailed explanation will be made on the problems of the Patent Document 1 and the Patent Document 2. First of all, explanation will be made on the problem of the Patent Document 1. In the Patent Document 1 is applied a DPP (Differential-Push-Pull) method as the tracking error signal detection method, three (3) spots are irradiated upon the disc, and those reflection lights are detected. Also, as the focus error detection method is applied an astigmatism method therein. And, as the structure differing from the conventional DPP method, it is characterized that the polarization diffraction grating is disposed just under the objective lens. On this polarization diffraction grating, the grating is so disposed that no stray light from other layer(s) enters into the light receiving parts of the photo detector when recoding/reproducing the multi-layer disc. Herein, explanation will be given on a relationship between the signal light and the stray light of the conventional DPP method. In FIGS. 5 and 6 are shown geometrical optic calculation results of the signal light and the stray light on the detector when applying the conventional astigmatism method therein. The calculation is conducted with using the following condition:

<Calculation Condition>
wavelength; 405 nm
NA; 0.85
detecting magnification; 22 times Herein, FIGS. 5A and 5B show a case where the layers locate at 75 µm and 100 µm from the disc surface, i.e., a gap between the layers is 25 µm. FIG. 5A shows the signal light and the stray light of 100 µm when reproducing at position of 75 µm, and FIG. 5B shows the signal light and the stray light of 75 µm when reproducing at the position of 100 µm. However, for simplifying explanation, in relation with the signal light, there are shown three (3) pieces of beams, and in relation with the stray light, thee is shown only a main beam having a large quantity light.

The results shown in FIGS. 5A and 5B are similar to those shown in the Patent Document 1. For this reason, with such structure as shown in the Patent Document 1, it is possible to escaped from the stray light.

Figure 6A:
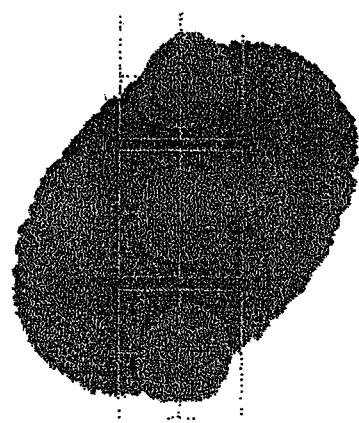
FIGS. 6A and 6B are views for showing a signal light and a stray light on the photo detector, when recording/reproducing a disc of the conventional type, having a small gap between the layers, according to the embodiment 1.
Figure 6B:
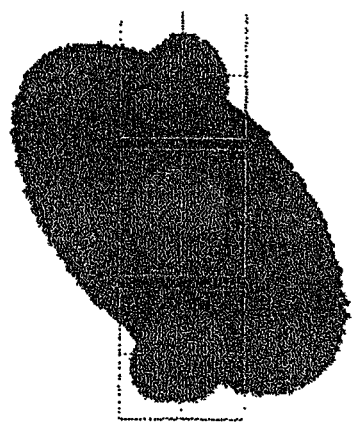

Next, FIGS. 6A and 6B show a case where the layers locate at 90 μm and 85 μm from the disc surface, i.e., a gap between the layers is 5 μm. FIG. 6A shows the signal light and the stray light of 90 μm when reproducing at position of 85 μm, and FIG. 6B shows the signal light and the stray light of 85 μm when reproducing at the position of 90 μm. From the results shown in FIGS. 5A and 5B and 6A and 6B, it can be seen that an amplitude of the stray light on the detector surface depends on the gap between the layers of the disc. For this reason, in case where the gap between the disc layers is small, for letting the stray light to enter into the light receiving parts with the structure shown in the Patent Document 1, it is necessary to enlarge a central region of the diffraction grating to be large. Further, in the Patent Document 1 is described, "Since difference of light quantity is large between the $0^{th}$ light reflecting on a target layer and the $0^{th}$ light reflecting on the neighbor layer, the $0^{th}$ light due to the neighbor layer does not have a large influence upon the difference signal to be used for detecting the tracking error signal with the DPP method, i.e., (B+C)−(A+D) signal.", however in actual, on the multi-layer disc, since the reflection lights from plural numbers of layers enter into the light receiving parts for the $0^{th}$ light, and the gap between the layers comes to be small, thereby the quantity of light comes to be large with respect to the $0^{th}$ light, then even the $0^{th}$ light having a large quantity light affects a large influence. For this reason, for obtaining a stable DPP signal on the multi-layer disc having a small gap between the layers, it is necessary to apply such structure that the stray light does not enter into all of the light receiving parts of three (3) beams. Also, with the astigmatism method, i.e., the structure of the Patent Document 1, it has a problem. With the astigmatism method, the focus error signal is detected by adding the astigmatism, intentionally. However, in case where the gap between the layers is small, the stray light of the astigmatism method does not form a circular spot on the photo detector, because of the astigmatism, but is bent or destroyed. For this reason, for separating the signal light from the stray light, it is necessary to further widen the region of the polarization diffraction grating.

Figure 7A:
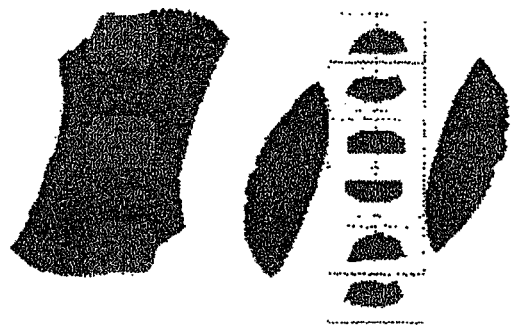
FIGS. 7A and 7B are views for showing a signal light and a stray light on the photo detector, when recording/reproducing a disc of the structure of the Patent Document 1, having a large gap between the layers, according to the embodiment 1.
Figure 7B:
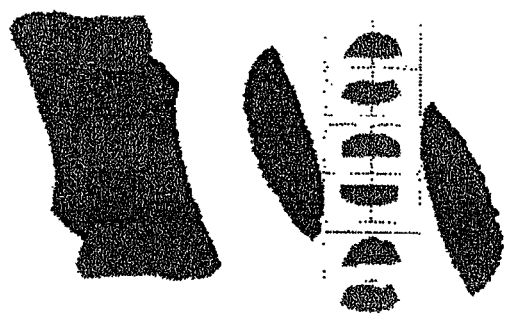

A result of taking the above-mentioned into the consideration is shown in FIGS. 7A and 7B. FIGS. 7A and 7B show the case when avoiding the stray light with the structure shown in the Patent Document 1 under the same condition to that in FIGS. 6A and 6B. FIG. 7A shows the signal light and the stray light of 90 μm when reproducing the position of 85 μm, and FIG. 7B shows the signal light and the stray light of 85 μm when reproducing the position of 90 μm. However, in this instance, an area of the central region of the polarization diffraction grating shown in FIG. 2 is (XH, XV)=(1.00, 0.67) with respect to an effective diameter, and then it can be seen that there is necessary of diffracting almost of all light beams of the signal light.

As is shown in FIGS. 7A and 7B, it can be seen that the stray light of other layer(s) does not enter into the light receiving parts, and at the same time, also a central region of the signal light extending into tangential direction (Tan) of the disc does not enter into the light receiving parts. If the central region of the signal light extending into the Tan direction does not enter into the light receiving parts, in this manner, it is impossible to obtain a stable focus error signal of the astigmatism method. Herein, as a countermeasure thereof can be considered, simply, detection of the focus error signal with using a light beam diffracting from the central region of the polarization diffraction grating, for example; however it is impossible to detect the stable focus error signal because of the following reasons:

In case of a system of high NA, such as, the BD, for example, it is necessary or essential to make a spherical aberration compensation accompanying with an error in thickness of a protection layer. For this reason, in general, such a spherical aberration is generated by the objective lens, that it cancels the thickness of the protection layer, through changing converging/diverging condition of the light beam entering into the objective lens, and thereby detecting the stable reproduction signal. However, if disposing the diffraction grating at the position same to that of the objective lens, the converging/diverging condition of the light beam entering into the diffraction grating is changed depending on the layer, on which recording/reproducing is made. If the converging/diverging condition of the light beam entering into the diffraction grating is changed, since the diffraction direction differs from after emitting from the diffraction grating, therefore, the position of the signal portion on the photo detector is changed. With this, the focus error signal is changed depending on the reproduction layer of the disc, and therefore it is impossible to detect the stable focus error signal on each of the layers.

As was mentioned above, in case where the gap is small between the layers, the structure shown in the Patent Document 1 has no compatibility of detection of the focus error signal and detection of the tracking error signal (i.e., avoiding the stray light(s) from other layer(s)). With this, nothing is mentioned in the Patent Document 1.

Next, explanation will be given on a problem of a one (1) beam method. Within such one (1) beam method as described in the Non-Patent Document 1 or the Patent Document 2, one (1) light beam is irradiated on a disc, and the reflection light is divided into plural numbers of regions thought the diffraction grating, wherein a signal is produced by detecting the divided light on the respective light receiving parts. As the problems thereof can be listed up the followings: i.e., that a central region of the diffraction grating must be made large if the gap between the layers is small, and that since the objective lens follows a track, then the stray light component moves accompanying with that if it shifts in a radial direction. In relation to the central region, though it is the same contents to that of the Patent Document 1, no mentioning is made on the movement of the stray light component. This is because of a large difference, although the polarization diffraction grating is disposed to be movable, shifting together with the objective lens, but on the other hand, the diffraction grating in the Non-Patent Document 1 and the Patent Document 2 is disposed fixedly. In case of the movable arrangement, since the position where the diffraction grating is disposed does not change with respect to the effective diameter of the objective lens if the objective lens is shifted, and therefore the position of the stray light does not change. On the other hand, in case of the fixed arrangement, since the position of the diffraction grating changes with respect to the effective diameter of the objective lens if the objective lens is shifted, the position of the stray light seems to change. In this instance, it can be considered sufficient to dispose the diffraction grating for the one (1) beam method, to be movable; however, because of the following problems, it cannot be achieved.

For changing or executing the spherical aberration compensation, if the converging/diverging condition of the light beam is changed, then accompanying with that, the converging/diverging condition of the light beam entering into the diffraction grating is also changed. For this reason, if not enlarging the light receiving parts, in the direction of diffraction, it is impossible to obtain the stable reproduction signal and servo signal. Further, comparing to diffracting only the central portion, in which change of the converging/diverging condition of the light beam is small, as is in the Patent Document 1, with diffracting the light beams in all regions of the light beam as in the one (1) beam method, the converging/diverging condition on the diffraction grating differs, largely, and the influences thereof also become large. By the way, if trying to make the light receiving parts large, the stray lights of the multi-layers necessarily enter therein. For this reason, it is difficult to shift the diffraction grating having such structure as shown in the Patent Document 1, together with the objective lens. About this, it is also same to the detection method of the astigmatism method as shown in the Non-Patent Document 1, or the detection method of the knife-edge detection method as shown in Japanese Patent Laying-Open 2009-170060 (the Patent Document 3). For this reason, it is a very difficult problem to dispose the diffraction grating of the one (1) beam method in a movable manner.

On the contrary to that, with the structure of the present embodiment, it is possible to obtain the stable focus error signal and tracking error signal, even on the multi-layer disc having small gap between the layers, with using two (2) sets of diffraction gratings. Hereinafter, explanation will be made on it.

According to the present invention, two (2) sets of diffraction gratings are use, e.g., a polarization diffraction grating 25 and a diffraction grating 11. Among the light beam reflecting on the optical disc, only the light beam entering into the region DX of the polarization diffraction grating 25 is diffracted. Thereafter, the light beam enters into the diffraction grating 11. In this instance, the light beam diffracting on the diffraction grating region DX enters into the regions D1 and D3 of the diffraction grating 11. Herein, in the diffraction grating regions D1 and D3, since the light beam transmits through or emits from the polarization diffraction grating 25 as the $0^{th}$ dimensional diffraction light, and enters into the region D2 of the diffraction grating 11. The light beam entering into the region D2 of the diffraction grating 11 is diffracted in the regions Da, Db, Dc, Dd, De, Df, Dg and Dh of the region D2, and enters into the light receiving parts of the photo detector 10.

In this manner, with diffracting only the light beam entering into the region DX of the polarization diffraction grating 25, it is possible to dissolve the position change of the stray light accompanying with the shift of the objective lens, i.e., the problem of the one (1) beam method. However, although it is the problem that the light beam diffracted in the region DX of the polarization diffraction grating 25 also enters into the diffraction grating 11, however with this, in the present embodiment, the problem is dissolved by letting it to transmit through or emit therefrom the regions D1 and D3 of the diffraction grating 11 as the $0^{th}$ dimensional diffraction light. Also, it has such structure that the polarization diffraction grating 25 reduces the change of diffraction angle, by diffracting only the region DX at a central portion where the converging/diverging condition of the light beam is small, and at the same time, the signal light enters if recording/reproducing any layer, by enlarging the light receiving parts i1 and i2 for detecting the light beam diffracting in the region DX, into the direction of diffracting the light beam. And, although the stray lights from the multi-layers enter into the light receiving parts i1 and i2 for detecting the light beam diffracted in the region DX, but they are not detected as the tracking error signal having influences, and therefore no practical problem can be generated from.

Also, with the light beam emitting from the region DY of the polarization diffraction grating 25, as is shown in FIG. 4, the light beams diffracting in the regions Da, Db, Dc and Dd by the diffraction grating 11 are detected by detecting parts, which are aligned in the Tan direction, and the light beams diffracting in the regions De, Df, Dg and Dh are detected by detecting parts, which are aligned in the Rad direction. With this, it is possible to avoid the stray lights with high efficiency. Details thereof are described in the Patent Document 3. In this instance, in relation to the focus error signal, it is possible to detect the stable focus error signal with applying the knife-edge detecting method of dividing one (1) piece of a beam, but not the astigmatism method made up with three (3) pieces of light beams as shown in the Patent Document 1. Also, in the present embodiment, since one (1) piece of the beam is divided, there is no necessity of avoiding the stray light for three (3) pieces of beams as in the Patent Document 1, and therefore there is also no necessity of enlarging the central region of the diffraction grating.

Figure 8A:
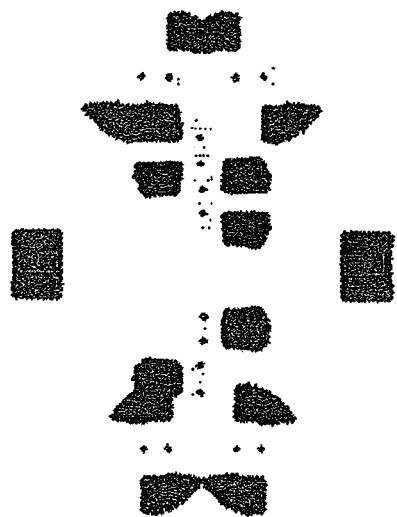
FIGS. 8A and 8B are views for showing a signal light and a stray light on the photo detector, when recording/reproducing a disc of the structure of the Patent Document 1, having a small gap between the layers, according to the embodiment 1.
Figure 8B:
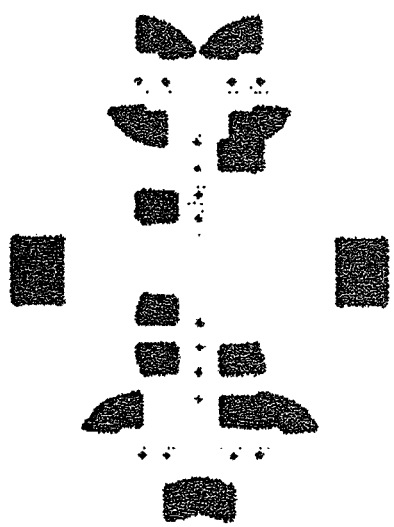

FIGS. 8A and 8B show a relationship between the signal light and the stray lights on the photo detector when recording/reproducing the disc having the gap of 5 μm between the layers, with the structure according to the present embodiment. FIG. 8A shows the signal light and the stray light of 90 μm when reproducing the position of 85 μm, and FIG. 8B shows the signal light and the stray light of 85 μm when reproducing the position of 90 μm. Further, calculation is executed with using the following condition:
<Calculating Condition>
wavelength; 405 nm
NA; 0.85
Detecting magnification; 20 times In this instance, an area of the central region of the polarization diffraction grating shown in FIG. 2 is (XH, XV)= (0.40, 0.55) with respect to the effective diameter, i.e., it is possible to avoid the stray lights in a very small region, comparing to the Patent Document 1.

From FIGS. 8A and 8B, it can be seen that the stray lights can be divided even if making the gap between the layers small. Also, since the position of the stray light does not change even if shifting the objective lens, the stray light does not enter into the light receiving part. With applying such structure, it is possible to divide the signal light from the stray light. However, in relation to the tracking error signal, since being same to that of the Patent Document 3, the structure according to the present embodiment, i.e., for avoiding the stray lights, it is possible to obtain the stable tracking error signal even with the multi-layer disc having a small gap between the layers.

Figure 9:
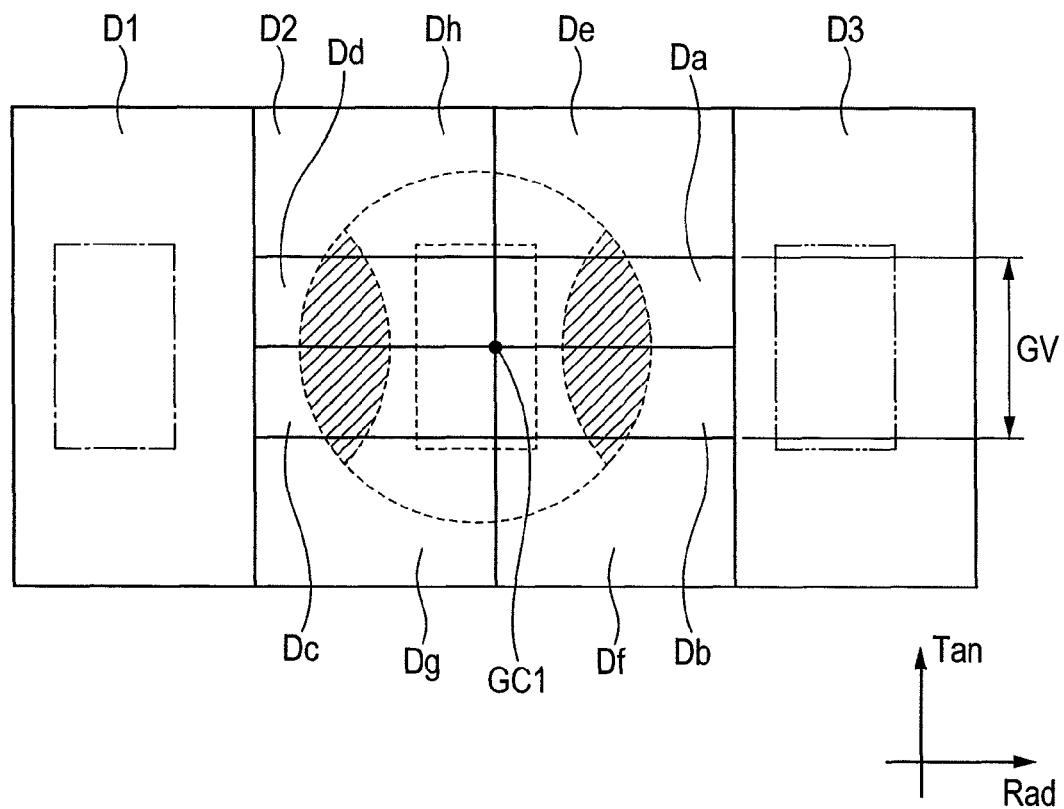
FIG. 9 is a view for showing a light beam on the diffraction grating when an objective lens is shifted in the structure according to the embodiment 1.

Next, explanation will be given on movement of the stray light accompanying with shifting of objective lens. FIG. 9 shows a positional relationship between the diffraction grating 11 and the light beam when the objective lens is shifted from the condition shown in FIG. 3. A solid line depicts a division line of the diffraction grating 11, and a dotted line depicts an outer configuration of the light beams (i.e., the signal light and the stray light) on the diffraction grating 11. From this figure, it can be seen that the signal light and the stray light are moved in the radial direction, accompanying with shift of the objective lens. Herein, since the signal light is focused on the surface of the photo detector even if the outer configuration of the signal light is shifted on the diffraction grating, there is no movement of the position of the light beam on the detector surface. Also, in relation to the stray light, the light beams of the stray light entering into the regions Da, Db, Dc and Dd of the regions D1 and D3 of the diffraction grating 11 do not change the regions of the diffraction grating if the objective lens is shifted. For this reason, the light beams of the stray light entering into the regions Da, Db, Dc and Dd of the regions D1 and D3 of the diffraction grating 11 do not change even on the detector surface. On the contrary thereto, it can be seen that the light beams of the stray light entering into the regions De, Df, Dg and Dh of the region D2 of the diffraction grating 11 generates a change between the regions accompanying with the shift of the objective lens. For this reason, the light beams of the stray light entering into the regions De, Df, Dg and Dh of the region D2 of the diffraction grating 11 change on the detector surface. According to the present embodiment, the stray light can be avoided with using such characteristics.

As was mentioned above, according to the present embodiment, the light beams diffracting in the regions Da, Db, Dc and Dd of the diffusion grating 11 are detected on the detecting parts aligning in the Tan direction, and the light beams diffracting in the regions De, Df, Dg and Dh are detected on the detecting parts aligning in the Rad direction. In this instance, the light beams of the stray light entering into the regions De, Df, Dg and Dh of the region D2 of the diffraction grating 11, which are changed accompanying with the shift of the objective lens, change accompanying with the shift of the objective lens. However, in case of the present invention, they do not enter into the light receiving parts even if aligning the light beams entering into the regions De, Df, Dg and Dh of the diffraction grating 11 in the Rad direction, and if shifting the objective lens in the Rad direction for avoiding the stray light in the Tan direction. Also, since the stray light entering into regions other than that does not change even if the objective lens is shifted, the stray light does not enter into the light receiving parts. And, in cases of such structures of the Non-Patent Document 1, the Patent Document 2 and the Patent Document 2 (fixed arrangement of the diffraction grating), for example, since the regions of the light beams of the signal light entering into the regions Da, Db, Dc and Dd of the region D2 of the diffraction grating 11 are changed with respect to the shift of the objective lens, for avoiding the stray light therefrom, it is necessary to enlarge width XH of the region DX of the polarization diffraction grating 25. However, if enlarging the width XH of the region DX of the polarization diffraction grating 25, it comes to be difficult to obtain the focus error signal and the tracking error signal, which are stabilized accompanying with shifting of the objective lens. On the contrary thereto, in case of the present invention, since the stray light does not move with respect to the shifting of the objective lens, there is no necessity of enlarging the width XH of the region DX of the polarization diffraction grating 25.

In this instance, from a viewpoint for avoiding the stray light, it is preferable that the width XV of the region DX with respect to the effective diameter on the polarization diffraction grating 25 is larger than the width GV of the region D2 with respect to the effective diameter on the diffraction grating 11. It is because, in case where the width XV of the region DX with respect to the effective diameter on the polarization diffraction grating 25 is smaller than the width GV of the region D2 with respect to the effective diameter on the diffraction grating 11, a part of the light beams entering into the regions Da, Db, Dc and Dd of the diffraction grating 11 generates a change between the regions accompanying with the shift of the objective lens. However, it is also possible to real with it by widening a gap between the light receiving parts, which are aligned in the Tan direction.

As was mentioned above, with applying such structure of using two (2) diffraction gratings as in the present embodiment, it is possible to detect the stable focus error signal and tracking error signal, even with the multi-layer optical disc.

Figure 10:
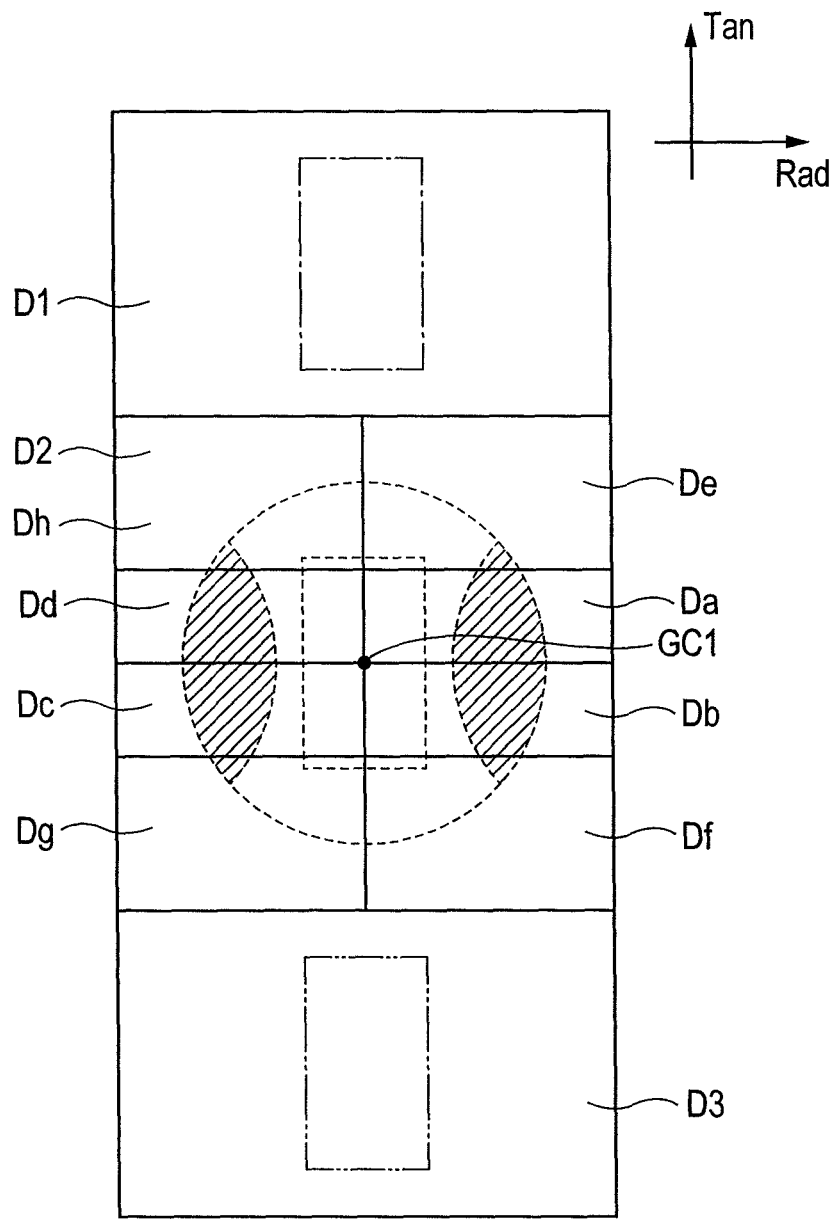
FIG. 10 is a view for showing another diffraction grating according to the embodiment 1.

However, the regions 1 and 3 of the diffraction grating 11 are in the Rad direction, according to the present embodiment, but they may be in the Tan direction, as is shown in FIG. 10, and the light receiving parts may be disposed depending on that. Also, according to the present embodiment, although the diffraction grating 11 is disposed after transmitting the beam splitter; however, the similar effect can be obtained if the diffraction grating 11 is disposed before transmitting the beam splitter as the polarization diffraction grating.

Diffraction efficiencies of the polarization diffraction grating 25 and the diffraction grating 11 of the present embodiment are one example, and the diffraction efficiency of the region DX of the polarization diffraction grating 25 may be $+1^{st}$ dimensional diffraction light: $0^{th}$ dimensional diffraction light: $-1^{st}$ dimensional diffraction light=0:0:1, for example. In this case, the diffraction grating 11 may have two (2) regions, e.g., D1 and D2. Also, the diffraction efficiency of the region D2 of the diffraction grating 11 may be $+1^{st}$ dimensional diffraction light: $0^{th}$ diffraction light: $-1^{st}$ dimensional diffraction light=1:0:1, for example. Further, although detection is made, as the light transmitting through the regions D1 and D3 of the diffraction grating 11 or the $0^{th}$ dimensional diffraction light, according to the present invention; however, not being restricted to that, and for example, from a viewpoint of reducing the detector to be small, the region DX of the polarization diffraction grating 25 may be brought to be close to the light receiving parts of the $\pm 1^{st}$ dimensional lights themselves, by setting the diffraction efficiency of the region D1 of the diffraction grating 11, $+1^{st}$ dimensional diffraction light: $0^{th}$ diffraction light: $-1^{st}$ dimensional diffraction light=1:0:0, and setting the diffraction efficiency of D3, $+1^{st}$ dimensional diffraction light: $0^{th}$ dimensional diffraction light: $-1^{st}$ dimensional diffraction light=0:0:1.

Figure 11:
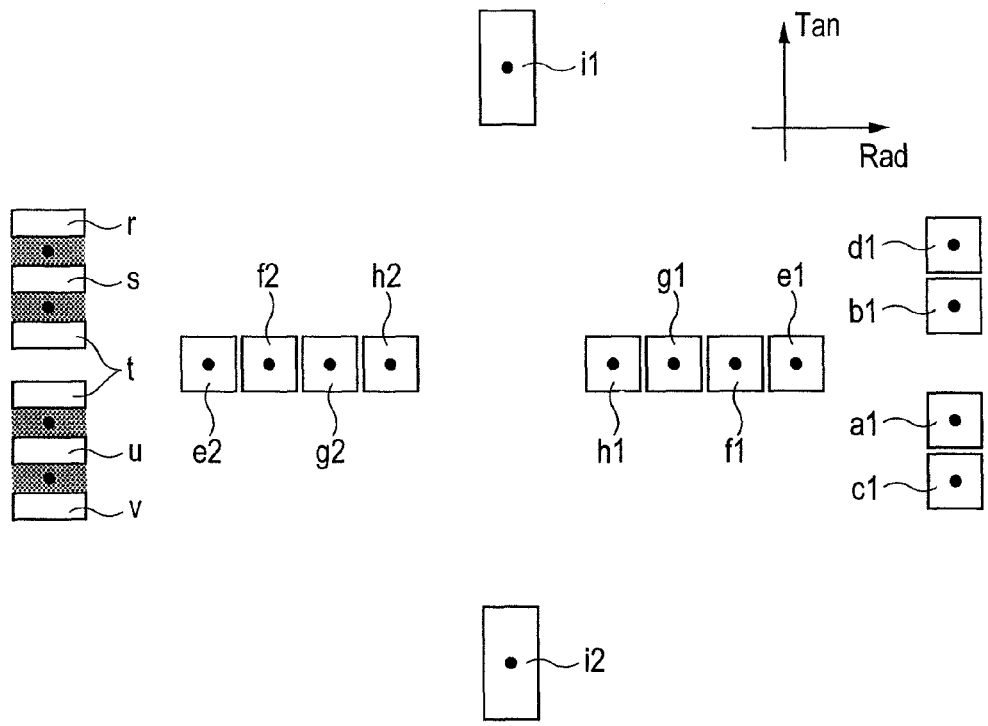
FIG. 11 is a view for showing arrangement of another light receiving parts of the photo detector according to the embodiment 1.

Also, the arrangement of the light receiving parts according to the present embodiment is an example, and the similar effect can be obtained with the arrangement of the light receiving parts as shown in FIG. 11, for example. Further, the shape of the light receiving part should not be a square, but may be an oblong or a circle or an ellipse. And, from a viewpoint of a number of output pins and S/N, the light receiving parts are connected with lines. According to the present embodiment, though the light receiving part for detecting the diffraction light in the region D2 of the diffraction grating 11 is disposed in a shape of H, but it may be disposed in a shape of I or T, etc.

Embodiment 2

Figure 12:
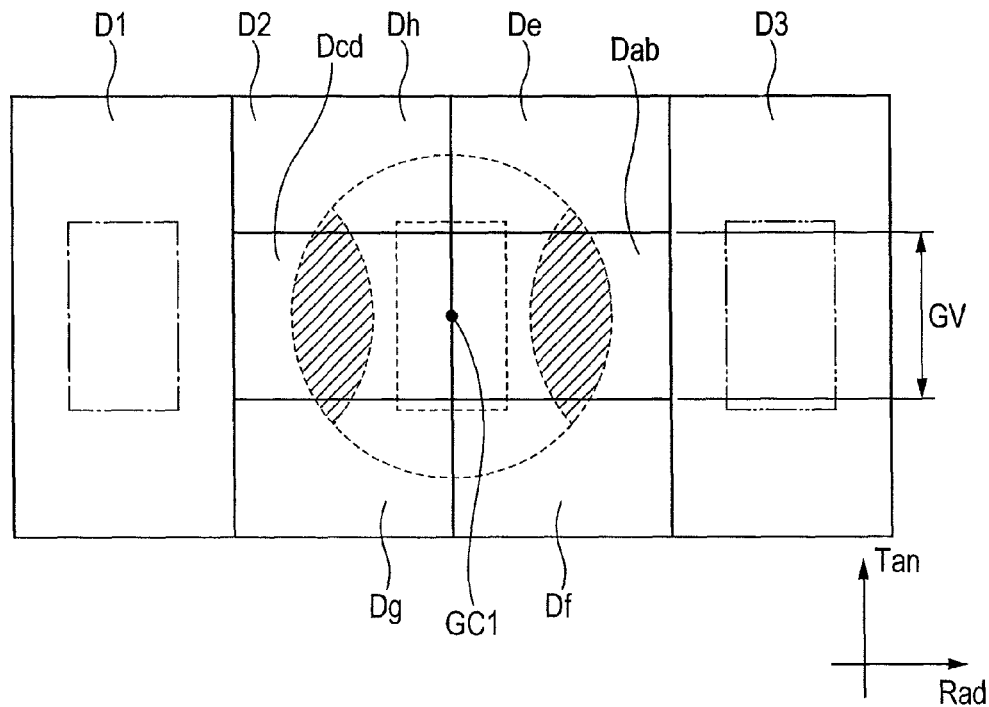
FIG. 12 is a view for showing a relationship between a pattern of a diffraction grating and a light beam on the diffraction grating according to an embodiment 2.
Figure 13:
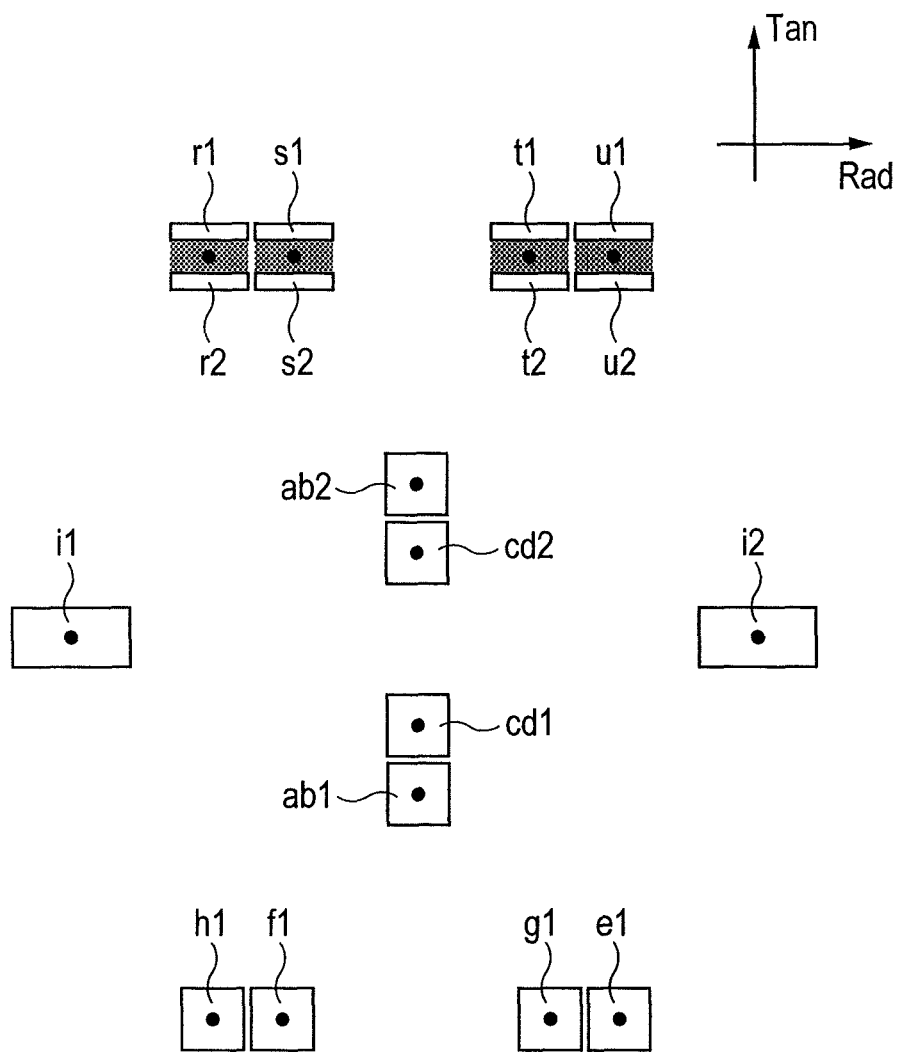
FIG. 13 is a view for showing an arrangement of light receiving parts of a photo detector according to the embodiment 2.

FIGS. 12 and 13 show the diffraction grating 11 of the optical pickup device and the light receiving parts of the photo detector 10, according to a second embodiment of the present invention. Difference from the embodiment 1 lies in that the pattern of the diffraction grating 11 and the arrangement of the light receiving parts of the photo detector 10 differ from; but other than that are similar to those of the embodiment 1, in the structures thereof.

Similar to FIG. 1 of the embodiment 1, from the laser diode 50 is emitted the light beam of P-polarization, having wavelength of about 405 nm, as the diverging light. The light beam of the P-polarization emitting from the laser diode 50 is converted into a light beam of S-polarization on a half wave plate. The light beam of the S-polarization is reflected on a polarization beam splitter 52. The light beam reflecting on the polarization beam splitter 52 is converted into nearly parallel light beams by the collimating lens 51. The light beams transmitting through the collimating lens 51 enter into a beam expander 54. The beam expander 54 is used for compensating the spherical aberration due to an error in thickness of a cover lay in thickness of a cover lay of the optical disc, by changing the diverging/converging condition of the light beam. The light beams emitting from the beam expander 54 are reflected on the reflection mirror 55, and after passing through the polarization diffraction grating 25, the quarter wave plate 56 and the objective lens 2, which are mounted on the actuator 5, they are focused on the optical disc. In this instance, the polarization diffraction grating 25 has the structure of causing the diffracting function upon the light beam of P-polarization, but not causing the diffracting function upon the light beam of S-polarization. Also, since the light beam of S-polarization is emitted in the form of the light beam of circular polarization by the function of the quarter wave plate 56, one (1) spot of the circular polarization is formed on the disc.

The light beam of the circular polarization reflecting on the optical disc enters into the objective lens 2 and the quarter wave plate 56. In this instance, the light beam of the circular polarization is converted into a light beam of the P-polarization by the function of the quarter wave plate 56. The light beam of the P-polarization enters into the polarization diffraction grating 25. FIG. 2 is a view for showing a patter of the polarization diffraction grating 25. Herein, a point GC in FIG. 2 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY, wherein the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $-1^{st}$ dimensional diffraction light=1:0:1. Also, the P-polarized light beam entering in the region DY transmits therethrough, or emits therefrom as the $0^{th}$ dimensional diffraction light.

The light beam emitting from the polarization diffraction grating 25, after passing through the reflection mirror 55, the beam expander 54, the collimating lens 51 and the beam expander 52, enters into a diffraction grating 11. FIG. 12 is a view for showing a pattern of the diffraction grating 11. Herein, it is assumed that the diffracting efficiency of the region D2 is $1^{st}$ dimensional diffraction light: $0^{th}$ dimensional diffraction light: $-1^{st}$ dimensional diffraction light=7:0:3, for example. Herein, a dotted line in FIG. 12 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively. The diffraction grating 11 can be divided, roughly, into regions D1, D2 and D3. And, the region D2 can be divided into regions Dab, Dcd, De, Df, Dg and Dh. Each of regions can be divided, depending on diffracted lights of the disc, and they can be divided into Dab and Dcd (i.e., a diffraction grating region B) where the $\pm 1^{st}$ dimensional diffraction lights of the disc enter into, De and Dh (i.e., a diffraction grating region A) where the $0^{th}$ dimensional diffraction light of the disc enters into, and Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Dab, Dcd, De, Df, Dg or Dh.

The light beam emitting from the diffraction grating 11 enters into light receiving parts of a photo detector 10. In FIG. 13 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The $+1^{st}$ dimensional diffraction light and the $-1^{st}$ dimensional diffraction light of the region DX of the polarization diffraction grating 25 enter into the light receiving parts i1 and i2. Also, the $+1^{st}$ dimensional diffraction light, entering into the region DY of the polarization diffraction grating 25 and diffracting on the regions Dab, Dcd, De, Df, Dg and Dh of the diffraction grating 11, enters into the light receiving parts ab1, cd1, e1, f1, g1 and h1. Also, $-1^{st}$ dimensional diffraction light diffracting on the regions Dab and Dcd enters into the light receiving parts ab2 and cd 2, and $-1^{st}$ dimensional diffraction light diffracting on the regions De, Df, Dg and Dh enters into dark line portions of the light receiving portions r1, r2, s1, s2, t1, t2, u1 and u2 for use of detection of focus error signal, respectively.

The focus error signal (FES), the tracking error signal (TES) and RF signal (RF) are produced by executing the following operation upon signals AB1, CD1, E1, F1, G1, H1, AB2, CD2, R1, R2, S1, S2, T1, T2, U1, U2, I1 and I2, which are obtained from the light receiving parts ab1, cd1, e1, f1, g1, h1, ab2, cd2, r1, r2, s1, s2, t1, t2, u1, u2, i1 and i2.

FES=(R1+S2+T2+U1)−(R2+S1+T1+U2)

TES={(AB1+AB2)−(CD1+CD2)}−k×{(E1+F1)−(G1+H1)}

RF=AB1+AB2+CD1+CD2+E1+F1+G1+H1+I1+I2  (Eq. 3)

Further, k is a coefficient for not generating a DC component in the tracking error signal when shifting the objective lens. Herein, a focus error detection method is the knife-edge detection method.

The present embodiment is characterized in that, similar to the embodiment 1 mentioned above, the diffraction gratings are disposed on a movable portion and a fixed portion, respectively. The difference from the embodiment 1 lies in the difference of the divided regions Dab and Dcd of the diffraction grating 11, although the regions Da and Db and the regions Dc and Dd are provided in the embodiment 1; however in the present embodiment, the region Dab and the region Dcd are provided. Further, the light beams diffracting from the regions Dab and Dcd are detected on two (2) sets of light receiving parts, respectively, thereby reducing the number of the light receiving parts; i.e., it is possible to achieve small-sizing of the detector comparing to that according to the embodiment 1.

Similar to the embodiment 1, by diffracting only the light beam(s) entering into the region DX of the polarization diffraction grating 25, it is possible to dissolve the positional change of the stray light(s) accompanying with shifting of the objective lens, i.e., the problem of the one (1) beam method. However, the light beam diffracting on the region DX of the polarization diffraction grating 25 enters also into the diffraction grating 11, and this brings about a problem; however, with this, according to the present embodiment, the problem is dissolved by letting it to transmit through the regions D1 and D3 of the diffraction grating 11, or to emit therefrom as the $0^{th}$ dimensional diffraction light. Also, the polarization diffraction grating 25 is in structures, for reducing change of the diffraction angle, by letting the light beam only on the region DX at the central portion where change of the diverging/converging condition of the light beam is small, thereby reducing the change of the diffraction angle, and at the same time, for letting the signal light to enter into even when recording/reproducing any layer, by enlarging the light receiving parts i1 and i2 for detecting the light beam diffracting on the region DX into the direction of diffraction. And, the stray light(s) from other layer(s) enter(s) into the light receiving parts i1 and i2 for detecting the light beam diffracting on the region DX, however since it/they is/are not detected as an influential tracking error signal, it/they bring(s) about no practical problem.

Also, with the light beams emitting from the region DY of the polarization diffraction grating 25, as is shown in FIG. 12, the light beam diffracted on the regions Dab and Dcd by the diffraction grating 11 is detected by the detecting parts, which are aligned in the Tan direction, and the light beam diffracted on the regions De, Df, Dg and Dh is detected by the detecting parts, which are aligned in the Rad direction. With this, it is possible to avoid the stray light(s) with high efficiency. About that, because of an arrangement of the light receiving parts almost similar to that of the embodiment 1 shown in FIGS. 8A and 8B, it can be seen that the stray light(s) can be avoided with high efficiency.

As was mentioned above, with applying the structure of using two (2) sets of diffraction gratings therein, it is possible to detect the stable focus error signal and tracking error signal even with the multi-layer optical disc.

However, according to the present embodiment, although the diffraction grating 11 is disposed after transmitting the beam splitter; but the similar effect can be obtained if disposing it before transmitting the beam splitter while replacing the diffraction grating 11 by the polarization diffraction grating. Also, diffraction efficiencies of the polarization diffraction grating 25 and the diffraction grating 11 of the present embodiment are one example, and the diffraction efficiency of the region DX of the polarization diffraction grating 25 may be $+1^{st}$ dimensional diffraction light: $0^{th}$ dimensional diffraction light: $-1^{st}$ dimensional diffraction light=0:0:1, for example. In this case, the diffraction grating 11 may has two (2) regions, e.g., D1 and D2. Also, the diffraction efficiency of the region D2 of the diffraction grating 11 may be $+1^{st}$ dimensional diffraction light: $0^{th}$ diffraction light: $-1^{st}$ dimensional diffraction light=1:0:1, for example. Further, in the present embodiment, although detection is made on the light beam transmitting through the regions D1 and D3 of the diffraction grating 11 or emitting therefrom as the $0^{th}$ dimensional diffraction light, but it should not be restricted to this, for example, from a viewpoint of reducing the detector to be small, the region DX of the polarization diffraction grating 25 may be brought to be close to the light receiving parts of the $\pm 1^{st}$ dimensional lights themselves, by setting the diffraction efficiency of the region D1 of the diffraction grating 11, $+1^{st}$ dimensional diffraction light: $0^{th}$ diffraction light: $-1^{st}$ dimensional diffraction light=1:0:0, and setting the diffraction efficiency of D3, $+1^{st}$ dimensional diffraction light: $0^{th}$ dimensional diffraction light: $-1^{st}$ dimensional diffraction light=0: 0:1.

Also, the arrangement of the light receiving parts according to the present embodiment is an example, and the similar effect can be obtained with the arrangement of the light receiving parts as shown in FIG. 11, for example. Further, the shape of the light receiving part should not be a square, but may be an oblong or a circle or an ellipse. And, from a viewpoint of a number of output pins and S/N, the light receiving parts are connected with lines.

Embodiment 3

Figure 14:
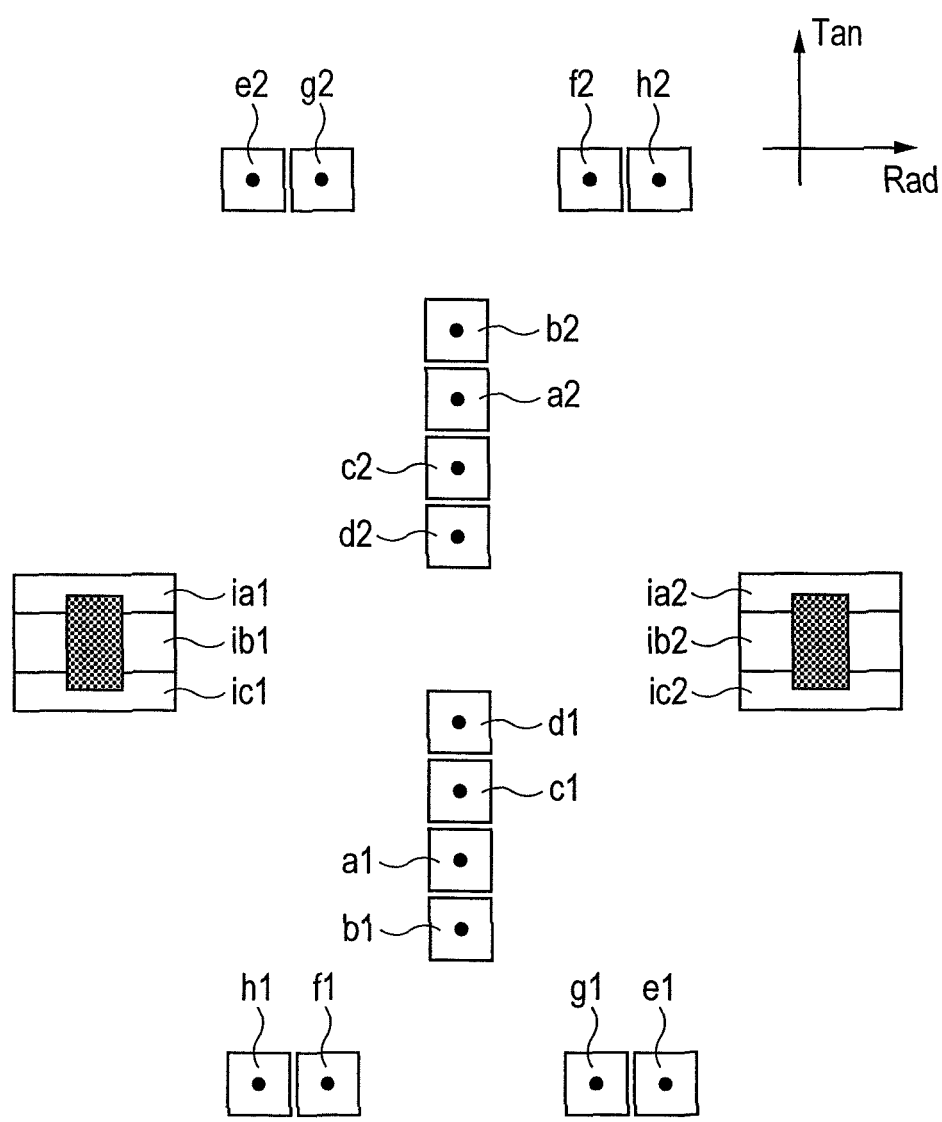
FIG. 14 is a view for showing an arrangement of light receiving parts of a photo detector according to an embodiment 3.

FIG. 14 is a view for showing the light receiving parts of the photo detector 10 of the optical pickup device, according to a third embodiment of the present invention. Difference between the embodiment 1 lies in that the light receiving parts of the diffraction grating 11 and the photo detector 10 differ from, but other than that are similar to those of the embodiment 1, in the structures thereof.

Similar to FIG. 1 of the embodiment 1, from the laser diode 50 is emitted the light beam of P-polarization, having wavelength of about 405 nm, as the diverging light. The light beam of the P-polarization emitting from the laser diode 50 is converted into a light beam of S-polarization on a half wave plate. The light beam of the S-polarization is reflected on a polarization beam splitter 52. The light beam reflecting on the polarization beam splitter 52 is converted into nearly parallel light beams by the collimating lens 51. The light beams trans- mitting through the collimating lens 51 enter into a beam expander 54. The beam expander 54 is used for compensating the spherical aberration due to an error in thickness of a cover lay in thickness of a cover lay of the optical disc, by changing the diverging/converging condition of the light beam. The light beams emitting from the beam expander 54 are reflected on the reflection mirror 55, and after passing through the polarization diffraction grating 25, the quarter wave plate 56 and the objective lens 2, which are mounted on the actuator 5, they are focused on the optical disc. In this instance, the polarization diffraction grating 25 has the structure of causing the diffracting function upon the light beam of P-polarization, but not causing the diffracting function upon the light beam of S-polarization. Also, since the light beam of S-polarization is emitted in the form of the light beam of circular polarization by the function of the quarter wave plate 56, one (1) spot of the circular polarization is formed on the disc.

The light beam of the circular polarization reflecting on the optical disc enters into the objective lens 2 and the quarter wave plate 56. In this instance, the light beam of the circular polarization is converted into a light beam of the P-polarization by the function of the quarter wave plate 56. The light beam of the P-polarization enters into the polarization diffraction grating 25. FIG. 2 is a view for showing a patter of the polarization diffraction grating 25. Herein, a point GC in FIG. 2 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY, wherein the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $-1^{st}$ dimensional diffraction light=1:0:1. Further, to the $+1^{st}$ dimensional diffraction light and the $-1^{st}$ dimensional diffraction light diffracting on the region DX are added defocus aberration opposite to each other, respectively. Also, the P-polarized light beam entering in the region DY transmits therethrough, or emits therefrom as the $0^{th}$ dimensional diffraction light.

The light beam emitting from the polarization diffraction grating 25, after passing through the reflection mirror 55, the beam expander 54, the collimating lens 51 and the beam expander 52, enters into a diffraction grating 11. FIG. 3 is a view for showing a pattern of the diffraction grating 11. Herein, a dotted line in FIG. 3 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively.

The diffraction grating 11 can be divided, roughly, into regions D1, D2 and D3. And, the region D2 can be divided into regions Da, Db, Dc, Dd, De, Df, Dg and Dh. Each of regions can be divided, depending on diffracted lights of the disc, and they can be divided into regions Da, Db, Dc and Dd (i.e., a diffraction grating region B) where the $\pm 1^{st}$ dimensional diffraction lights of the disc enter into, regions De and Dh (i.e., a diffraction grating region A) where the $0^{th}$ dimensional diffraction light of the disc enters into, and Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Da, Db, Dc, Dd, De, Df, Dg or Dh. Herein, for example, it is assumed that a diffraction efficiency of the region D2 is $+1^{st}$ dimensional diffraction light: $0^{th}$ dimensional diffraction light: $-1^{st}$ dimensional diffraction light=1:0:1.

The light beam emitting from the diffraction grating 11 enters into light receiving parts of a photo detector 10. In FIG. 14 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The $+1^{st}$ dimensional diffraction light and the $-1^{st}$ dimensional diffraction light of the region DX of the polarization diffraction grating 25 enter into the light receiving parts ia1, ib1 and ic1 and ia2, ib2 and ic2. Also, the $+1^{st}$ dimensional diffraction light emitting from the region DY of the polarization diffraction grating 25 and diffracting on the regions Da, Db, Dc, Dd, De, Df, Dg and Dh of the diffraction grating 11 enters into the light receiving parts a1, b1, c1, d1, e1, f1, g1 and h1. And, the $-1^{st}$ dimensional diffraction light diffracting on the regions Da, Db, Dc, Dd, De, Df, Dg and Dh enters into the light receiving pats a2, b2, c2, d2, e2, f2, g2 and h2.

The focus error signal (FES), the tracking error signal (TES) and RF signal (RF) are produced by executing the following operation upon signals A1, B1, C1, D1, E1, F1, G1, H1, A2, B2, C2, D2, E2, F2, G2, H2, IA1, IB1, IC1, IA2, 1B2 and IC2, which are obtained from the light receiving parts a1, b1, c1 d1, e1, f1, g1, h1, a2, b2, c2, d2, e2, f2, g2, h2, ia1, ib1, ic1, ia2, ib2 and ic2.

FES=(IA1+IC1+IB2)−(IA2+IC2+IB1)

TES={(A1+A2+B1+B2)−(C1+C2+D1+D2)}−k×{(E1+E2+F1+F2)−(G1+G2+H1+H2)}

RF=(A1+A2+B1+32)+(C1+C2+D1+D2)+(E1+E2+F1+F2)+(G1+G2+H1+H2)+(IA1+IB2+IC2)+(IA2+IB1+IC1)     (Eq. 4)

Further, k is a coefficient for not generating a DC component in the tracking error signal when shifting the objective lens. Herein, a focus error detection method is a spot size detection method.

The present embodiment is characterized in that, similar to the embodiment 1 mentioned above, the diffraction gratings are disposed on a movable portion and a fixed portion, respectively. The difference between the embodiment 1 lies in that, the focus error signal is detected by the light beam diffracting on the region DX, with adding a defocus aberration to the light beam emitting from the region DX of the polarization diffraction grating 25.

Similar to the embodiment 1, by diffracting only the light beam(s) entering into the region DX of the polarization diffraction grating 25, it is possible to dissolve the positional change of the stray light(s) accompanying with shifting of the objective lens, i.e., the problem of the one (1) beam method. However, the light beam diffracting on the region DX of the polarization diffraction grating 25 enters also into the diffraction grating 11, and this brings about a problem; however, with this, according to the present embodiment, the problem is dissolved by letting it to transmit through the regions D1 and D3 of the diffraction grating 11, or to emit therefrom as the $0^{th}$ dimensional diffraction light. Also, the polarization diffraction grating 25 is in structures, for reducing change of the diffraction angle, by letting the light beam only on the region DX at the central portion where change of the diverging/converging condition of the light beam is small, thereby reducing the change of the diffraction angle, and at the same time, for letting the signal light to enter into even when recording/reproducing any layer, by enlarging the light receiving parts ia1, ib1, ic1, ia2, ib2 and ic2 for detecting the light beam diffracting on the region DX into the direction of diffraction, and thereby setting a dividing line into a direction of diffraction of the light beam. And, the stray light(s) from other layer(s) enter(s) into the light receiving parts ia1, ib1, ic1, ia2, ib2 and ic2 for detecting the light beam diffracting on the region DX, however since it/they is/are not detected as an influential tracking error signal, it/they bring(s) about no practical problem.

Also, with the light beams emitting from the region DY of the polarization diffraction grating 25, as is shown in FIG. 14, the light beam diffracted on the regions Da, Db, Dc and Dd, by the diffraction grating 11, is detected by the detecting parts, which are aligned in the Tan direction, and the light beam diffracted on the regions De, Df, Dg and Dh is detected by the detecting parts, which are aligned in the Rad direction. With this, it is possible to avoid the stray light(s) with high efficiency. About that, because of an arrangement of the light receiving parts almost similar to that of the embodiment 1 shown in FIGS. 8A and 8B, it can be seen that the stray light(s) can be avoided with high efficiency.

As was mentioned above, with applying the structure of using two (2) sets of diffraction gratings therein, it is possible to detect the stable focus error signal and tracking error signal even with the multi-layer optical disc.

Figure 15:
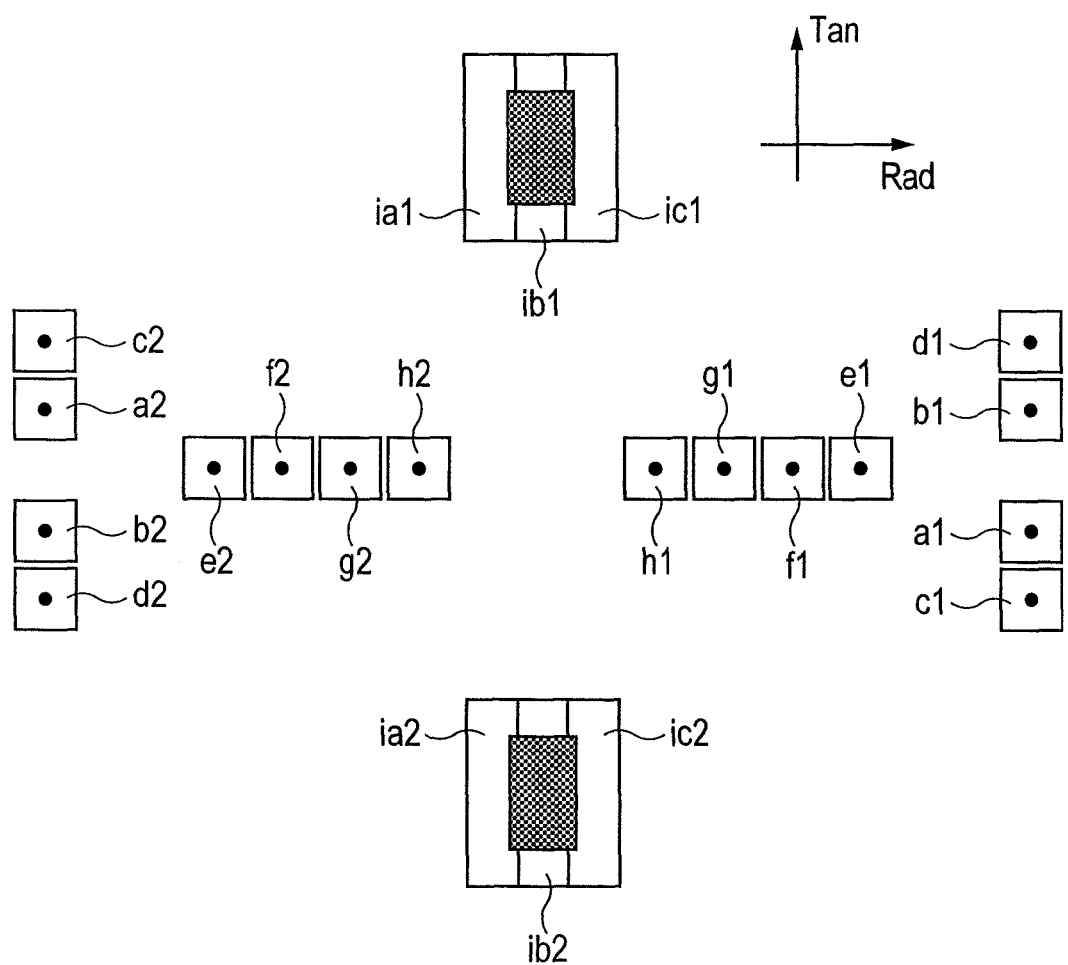
FIG. 15 is a view for showing another arrangement of light receiving parts of the photo detector according to the embodiment 3.
Figure 16:
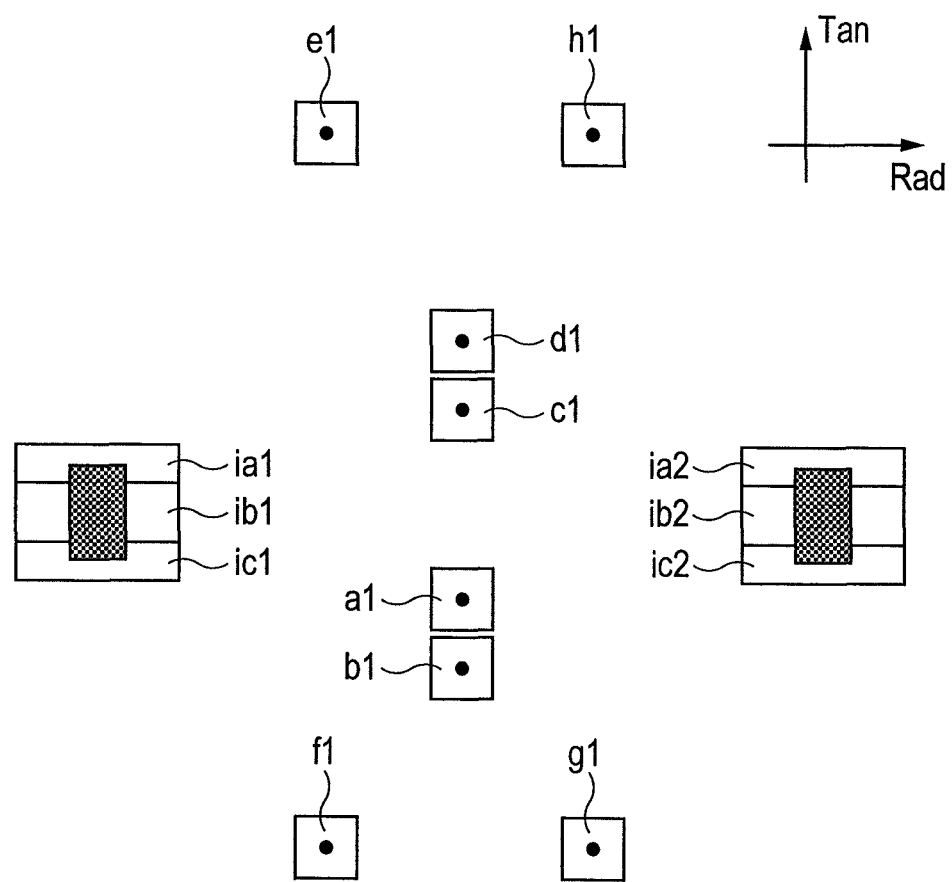
FIG. 16 is a view for showing a further other arrangement of light receiving parts of the photo detector according to the embodiment 3.
Figure 17:
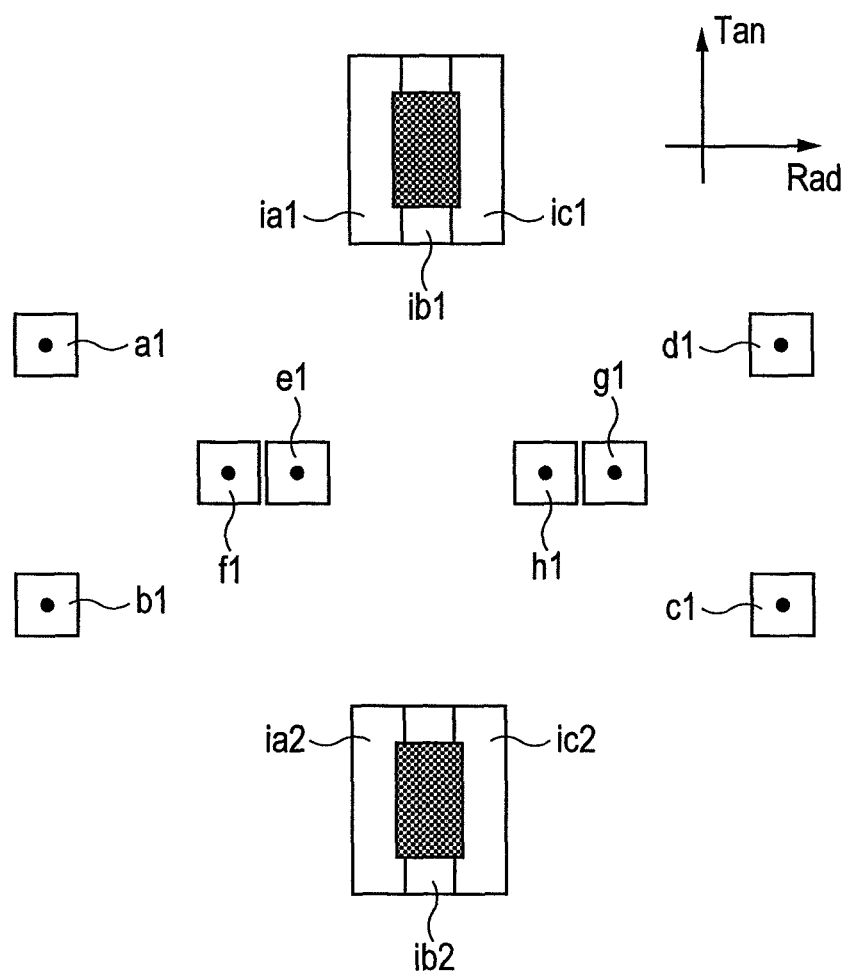
FIG. 17 is a view for showing a further other arrangement of light receiving parts of the photo detector according to the embodiment 3.

However, according to the present embodiment, although the diffraction grating 11 is disposed after transmitting the beam splitter; but the similar effect can be obtained if disposing it before transmitting the beam splitter while replacing the diffraction grating 11 by the polarization diffraction grating. Also, arrangement of the light receiving parts of the present embodiment is an example, and the similar effect can be obtained even if such arrangement of the light receiving parts as is shown in FIG. 15, for example. Also, a spherical aberration signal may be detected, for example, by detecting the focus error signal from the lights diffracting on the regions Da, Db, Dc, Dd, De, Df, Dg and Dh of the diffraction grating 11, and comparing it with the focus error signal detected from the light receiving parts ia1, ib1, ic1, ia2, ib2 and ic2. Further, the photo detector may small-sized by determining the diffraction efficiency of the diffraction grating 11, the $+1^{st}$ dimensional diffraction light: the $0^{th}$ dimensional diffraction light: $-1^{st}$ dimensional diffraction light=1:0:0, for example, and disposing the light receiving parts as is shown in FIG. 16 or 17. Further, according to the present embodiment, although detection is made upon transmission through the regions D1 and D3 of the diffraction grating 11 or as the $0^{th}$ dimensional diffraction light; however, not limited to this, for example, from a viewpoint of reducing the detector to be small, the region DX of the polarization diffraction grating 25 may be brought to be close to the light receiving parts of the $\pm 1^{st}$ dimensional lights themselves, by setting the diffraction efficiency of the region D1 of the diffraction grating 11, $+1^{st}$ dimensional diffraction light: $0^{th}$ diffraction light: $-1^{st}$ dimensional diffraction light=1:0:0, and setting the diffraction efficiency of D3, $+1^{st}$ dimensional diffraction light: $0^{th}$ dimensional diffraction light: $-1^{st}$ dimensional diffraction light=0:0:1.

Further, the shape of the light receiving part should not be a square, but may be an oblong or a circle or an ellipse. And, from a viewpoint of a number of output pins and S/N, the light receiving parts are connected with lines.

Embodiment 4

Figure 18:
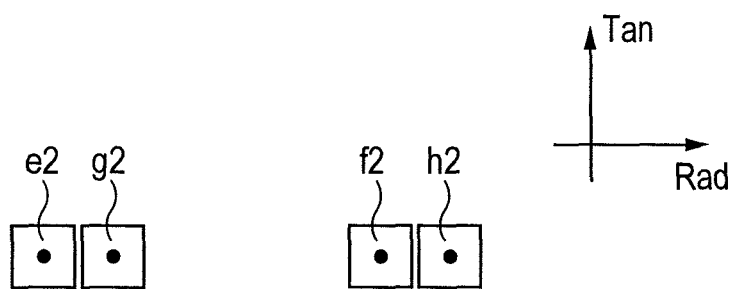
FIG. 18 is a view for showing an arrangement of light receiving parts of a photo detector according to an embodiment 4.
Figure 18:
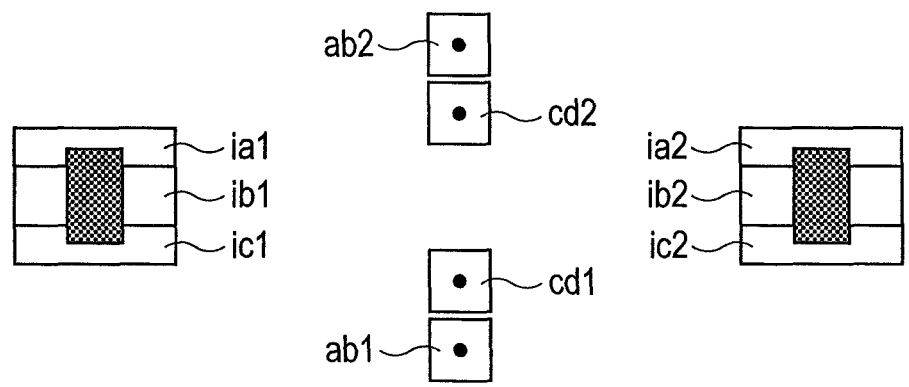
Figure 18:

FIG. 18 is a view for showing the light receiving parts of the photo detector 10 of the optical pickup device, according to a fourth embodiment of the present invention. Difference between the embodiment 1 lies in that the light receiving parts of the diffraction grating 11 and the photo detector 10 differ from, but other than that are similar to those of the embodiment 1, in the structures thereof.

Similar to FIG. 1 of the embodiment 1, from the laser diode 50 is emitted the light beam of P-polarization, having wavelength of about 405 nm, as the diverging light. The light beam of the P-polarization emitting from the laser diode 50 is converted into a light beam of S-polarization on a half wave plate. The light beam of the S-polarization is reflected on a polarization beam splitter 52. The light beam reflecting on the polarization beam splitter 52 is converted into nearly parallel light beams by the collimating lens 51. The light beams transmitting through the collimating lens 51 enter into a beam expander 54. The beam expander 54 is used for compensating the spherical aberration due to an error in thickness of a cover lay in thickness of a cover lay of the optical disc, by changing the diverging/converging condition of the light beam. The light beams emitting from the beam expander 54 are reflected on the reflection mirror 55, and after passing through the polarization diffraction grating 25, the quarter wave plate 56 and the objective lens 2, which are mounted on the actuator 5, they are focused on the optical disc. In this instance, the polarization diffraction grating 25 has the structure of causing the diffracting function upon the light beam of P-polarization, but not causing the diffracting function upon the light beam of S-polarization. Also, since the light beam of S-polarization is emitted in the form of the light beam of circular polarization by the function of the quarter wave plate 56, one (1) spot of the circular polarization is formed on the disc.

The light beam of the circular polarization reflecting on the optical disc enters into the objective lens 2 and the quarter wave plate 56. In this instance, the light beam of the circular polarization is converted into a light beam of the P-polarization by the function of the quarter wave plate 56. The light beam of the P-polarization enters into the polarization diffraction grating 25. FIG. 2 is a view for showing a patter of the polarization diffraction grating 25. Herein, a point GC in FIG. 2 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY, wherein the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $+1^{st}$ dimensional diffraction light=1:0:1. Further, to the $+1^{st}$ dimensional diffraction light and the $-1^{st}$ dimensional diffraction light diffracting on the region DX are added defocus aberration opposite to each other, respectively. Also, the P-polarized light beam entering in the region DY transmits therethrough, or emits therefrom as the $0^{th}$ dimensional diffraction light.

The light beam emitting from the polarization diffraction grating 25, after passing through the reflection mirror 55, the beam expander 54, the collimating lens 51 and the beam expander 52, enters into a diffraction grating 11. FIG. 12 is a view for showing a pattern of the diffraction grating 11. Herein, a dotted line in FIG. 12 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively. The diffraction grating 11 can be divided, roughly, into regions D1, D2 and D3. And, the region D2 can be divided into regions Dab, Dcd, De, Df, Dg and Dh. Each of regions can be divided, depending on diffracted lights of the disc, and they can be divided into regions Dab and Dcd (i.e., a diffraction grating region B) where the $\pm 1^{st}$ dimensional diffraction lights of the disc enter into, regions De and Dh (i.e., a diffraction grating region A) where the $0^{th}$ dimensional diffraction light of the disc enters into, and regions Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Dab, Dcd, De, Df, Dg or Dh. Herein, for example, it is assumed that a diffraction efficiency of the region D2 is $+1^{st}$ dimensional diffraction light: $0^{th}$ dimensional diffraction light: $-1^{st}$ dimensional diffraction light=1:0:1.

The light beam emitting from the diffraction grating 11 enters into light receiving parts of a photo detector 10. In FIG. 18 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The $+1^{st}$ dimensional diffraction light and the $-1^{st}$ dimensional diffraction light of the region DX of the polarization diffraction grating 25 enter into the light receiving parts ia1, ib1, ic1, ia2, ib2 and ic2. Also, the $+1^{st}$ dimensional diffraction light emitting from the region DY of the polarization diffraction grating 25 and diffracting on the regions of the diffraction grating 11, Dab, Dcd, De, Df, Dg and Dh enters into the light receiving parts a2, b2, c2, d2, e2, f2, g2 and h2.

The focus error signal (FES), the tracking error signal (TES) and RF signal (RF) are produced by executing the following operation upon signals AB1, CD1, E1, F1, G1, H1, AB2, CD2, E2, F2, G2, H2, IA1, IB1, IC1, IA2, IB2 and IC2, which are obtained from the light receiving parts ab1, cd1, e1, f1, g1, h1, ab2, cd2, e2, f2, g2, h2, ia1, ib1, ic1, ia2, ib2 and ic2.

FES=(IA1+IC1+IB2)−(IA2+IC2+IB1)

TES={(AB1+AB2)−(CD1+CD2)}−k×{(E1+E2+F1+F2)−(G1+G2+H1+H2)}

RF=(AB1+AB2)+(CD1+CD2)+(E1+E2+F1+F2)+(G1+G2+H1+H2)+(IA1+IB2+IC2)+(IA2+IB1+IC1)     (Eq. 5)

Further, k is a coefficient for not generating a DC component in the tracking error signal when shifting the objective lens. Herein, a focus error detection method is the spot size detection method.

The present embodiment is characterized in that, similar to the embodiment 1 mentioned above, the diffraction gratings are disposed on a movable portion and a fixed portion, respectively. The difference between the embodiment 1 lies in that, the focus error signal is detected by the light beam diffracting on the region DX, with adding a defocus aberration to the light beam emitting from the region DX of the polarization diffraction grating 25.

Similar to the embodiment 1, by diffracting only the light beam(s) entering into the region DX of the polarization diffraction grating 25, it is possible to dissolve the positional change of the stray light(s) accompanying with shifting of the objective lens, i.e., the problem of the one (1) beam method. However, the light beam diffracting on the region DX of the polarization diffraction grating 25 enters also into the diffraction grating 11, and this brings about a problem; however, with this, according to the present embodiment, the problem is dissolved by letting it to transmit through the regions D1 and D3 of the diffraction grating 11, or to emit therefrom as the $0^{th}$ dimensional diffraction light. Also, the polarization diffraction grating 25 is in structures, for reducing change of the diffraction angle, by letting the light beam only on the region DX at the central portion where change of the diverging/converging condition of the light beam is small, thereby reducing the change of the diffraction angle, and at the same time, for letting the signal light to enter into even when recording/reproducing any layer, by enlarging the light receiving parts ia1, ib1, ic1, ia2, ib2 and ic2 for detecting the light beam diffracting on the region DX into the direction of diffraction, and thereby setting a dividing line into a direction of diffraction of the light beam. And, the stray light(s) from other layer(s) enter(s) into the light receiving parts ia1, ib1, ic1, ia2, ib2 and ic2 for detecting the light beam diffracting on the region DX, however since it/they is/are not detected as an influential tracking error signal, it/they bring(s) about no practical problem.

Also, with the light beams emitting from the region DY of the polarization diffraction grating 25, as is shown in FIG. 18, the light beam diffracted on the regions Dab and Dcd, by the diffraction grating 11, is detected by the detecting parts, which are aligned in the Tan direction, and the light beam diffracted on the regions De, Df, Dg and Dh is detected by the detecting parts, which are aligned in the Rad direction. With this, it is possible to avoid the stray light(s) with high efficiency. About that, because of an arrangement of the light receiving parts almost similar to that of the embodiment 1 shown in FIGS. 8A and 8B, it can be seen that the stray light(s) can be avoided with high efficiency.

As was mentioned above, with applying the structure of using two (2) sets of diffraction gratings therein, it is possible to detect the stable focus error signal and tracking error signal even with the multi-layer optical disc.

Figure 19:
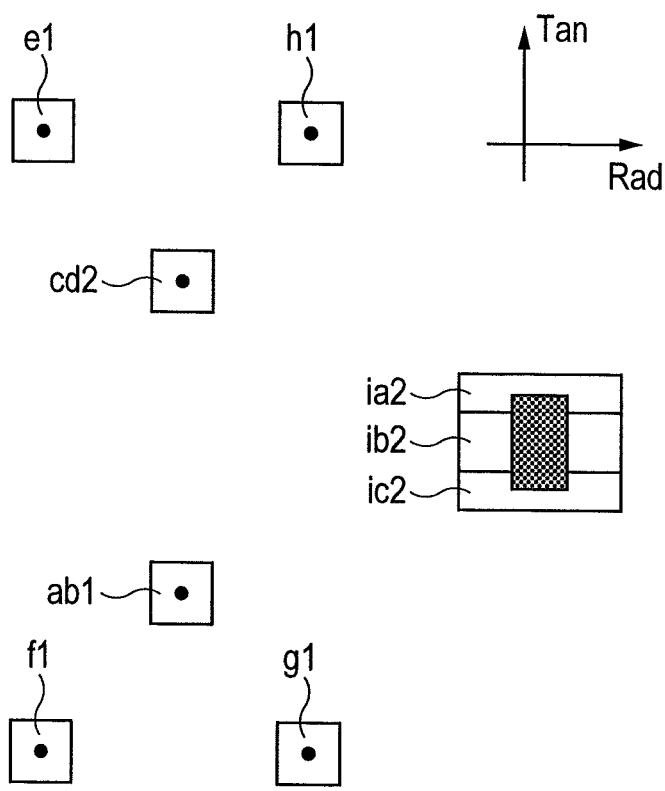
FIG. 19 is a view for showing another arrangement of light receiving parts of the photo detector according to the embodiment 4.

However, according to the present embodiment, although the diffraction grating 11 is disposed after transmitting the beam splitter; but the similar effect can be obtained if disposing it before transmitting the beam splitter while replacing the diffraction grating 11 by the polarization diffraction grating. Also, a spherical aberration signal may be detected, for example, by detecting the focus error signal from the lights diffracting on the regions De, Df, Dg and Dh of the diffraction grating 11, and comparing it with the focus error signal detected from the light receiving parts ia1, ib1, ic1, ia2, ib2 and ic2. Further, the photo detector may small-sized, by determining the diffraction efficiency of the diffraction grating 11, the $+1^{st}$ dimensional diffraction light: the $0^{th}$ dimensional diffraction light: $-1^{st}$ dimensional diffraction light=1:0:0, for example, and disposing the light receiving parts as is shown in FIG. 19. Further, according to the present embodiment, although detection is made upon transmission through the regions D1 and D3 of the diffraction grating 11 or as the $0^{th}$ dimensional diffraction light; however, not limited to this, for example, from a viewpoint of reducing the detector to be small, the region DX of the polarization diffraction grating 25 may be brought to be close to the light receiving parts of the $\pm 1^{st}$ dimensional lights themselves, by setting the diffraction efficiency of the region D1 of the diffraction grating 11, $+1^{st}$ dimensional diffraction light: $0^{th}$ diffraction light: $-1^{st}$ dimensional diffraction light=1:0:0, and setting the diffraction efficiency of D3, $+1^{st}$ dimensional diffraction light: $0^{th}$ dimensional diffraction light: $-1^{st}$ dimensional diffraction light=0:0:1.

Further, the shape of the light receiving part should not be a square, but may be an oblong or a circle or an ellipse. And, from a viewpoint of a number of output pins and S/N, the light receiving parts are connected with lines.

Embodiment 5

Figure 20:
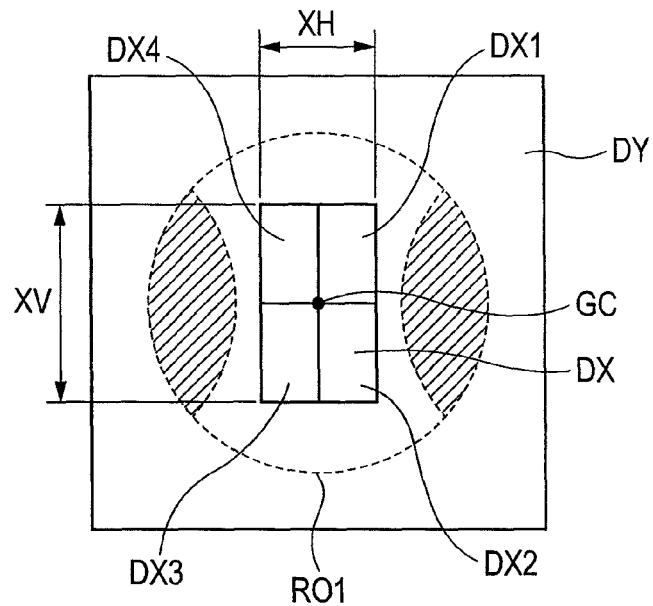
FIG. 20 is a view for showing a relationship between a pattern of a polarization diffraction grating and a light beam on the polarization diffraction grating according to an embodiment 5.
Figure 21:
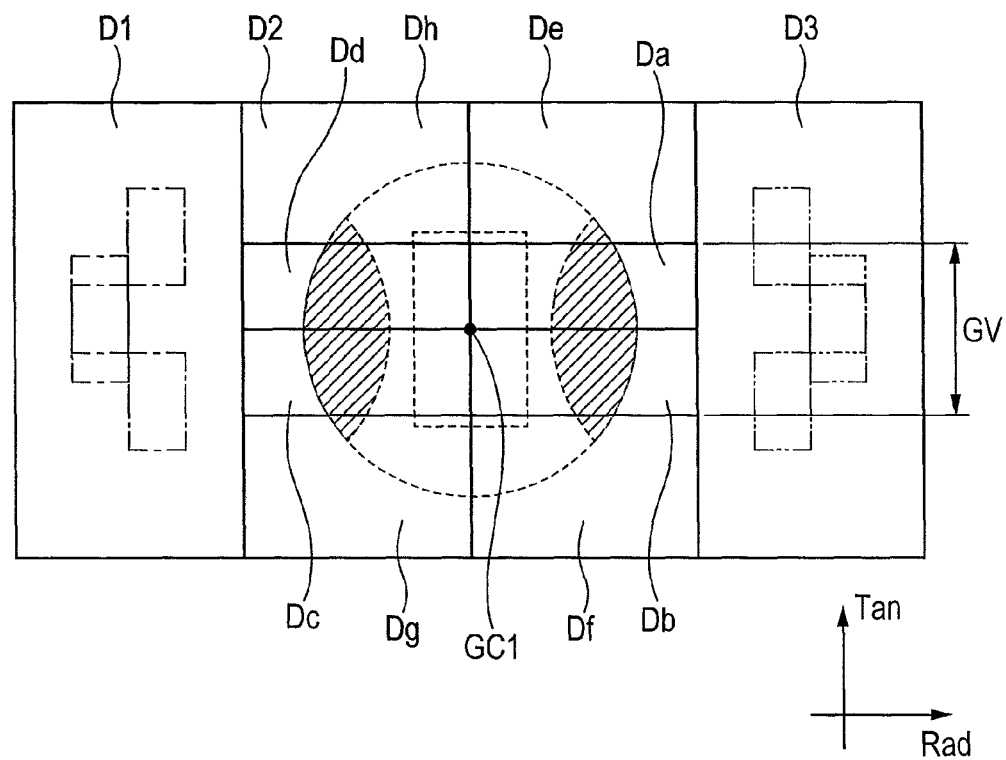
FIG. 21 is a view for showing a relationship between a pattern of a diffraction grating and a light beam on the diffraction grating according to an embodiment 5.
Figure 22:
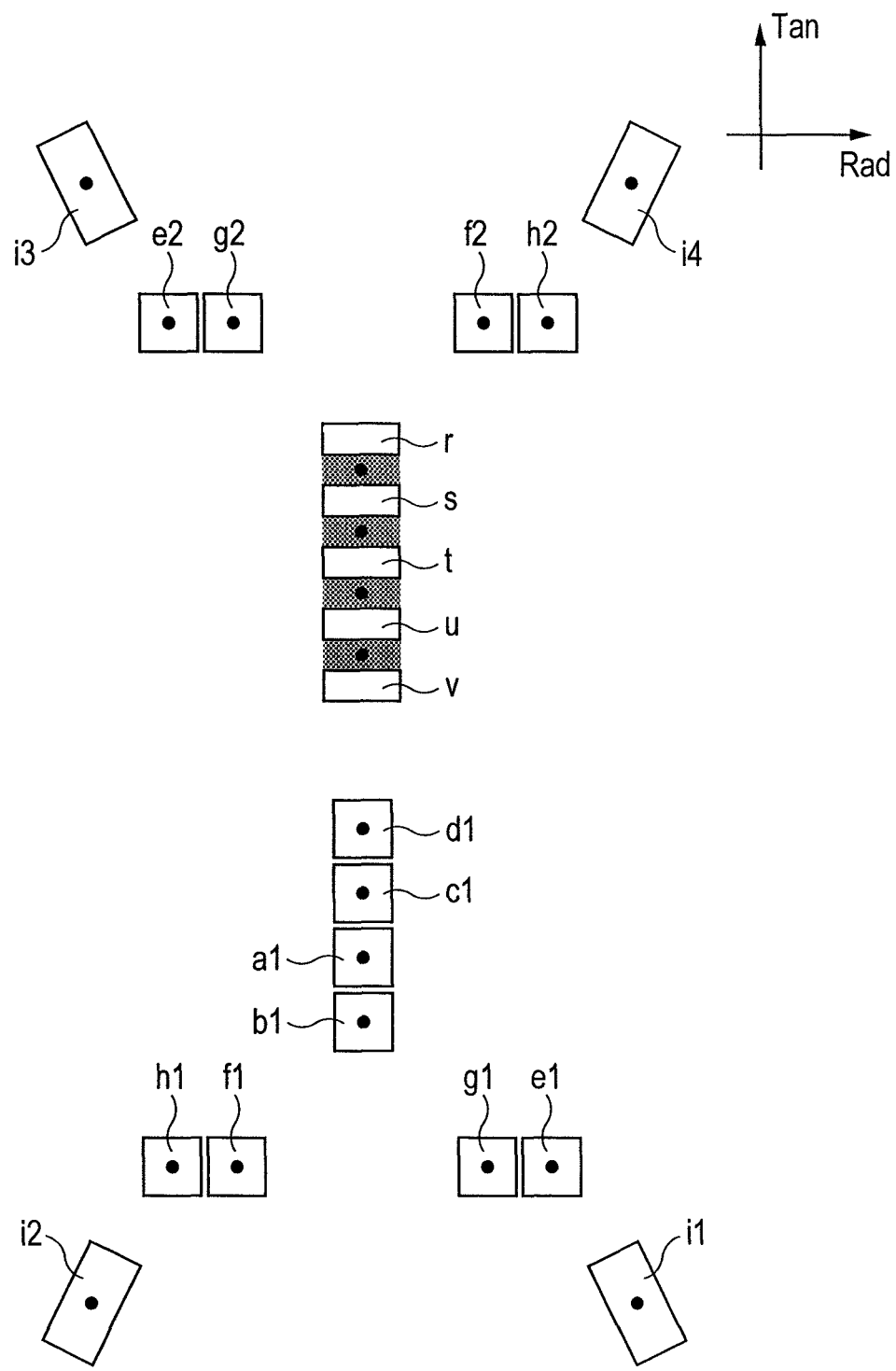
FIG. 22 is a view for showing an arrangement of light receiving parts of a photo detector according to an embodiment 5.

FIGS. 20, 21 and 22 are views for showing the light receiving parts of the polarization diffraction grating 25, the diffraction grating 11 and the photo detector 10 of the optical pickup device, according to a fifth embodiment of the present invention. Difference between the embodiment 1 lies in that the patterns of the polarization diffraction grating 25 and the diffraction grating 11, and the light receiving parts of the photo detector 10 differ from, but other than that are similar to those of the embodiment 1, in the structures thereof.

Similar to FIG. 1 of the embodiment 1, from the laser diode 50 is emitted the light beam of P-polarization, having wavelength of about 405 nm, as the diverging light. The light beam of the P-polarization emitting from the laser diode 50 is converted into a light beam of S-polarization on a half wave plate. The light beam of the S-polarization is reflected on a polarization beam splitter 52. The light beam reflecting on the polarization beam splitter 52 is converted into nearly parallel light beams by the collimating lens 51. The light beams transmitting through the collimating lens 51 enter into a beam expander 54. The beam expander 54 is used for compensating the spherical aberration due to an error in thickness of a cover lay in thickness of a cover lay of the optical disc, by changing the diverging/converging condition of the light beam. The light beams emitting from the beam expander 54 are reflected on the reflection mirror 55, and after passing through the polarization diffraction grating 25, the quarter wave plate 56 and the objective lens 2, which are mounted on the actuator 5, they are focused on the optical disc. In this instance, the polarization diffraction grating 25 has the structure of causing the diffracting function upon the light beam of P-polarization, but not causing the diffracting function upon the light beam of S-polarization. Also, since the light beam of S-polarization is emitted in the form of the light beam of circular polarization by the function of the quarter wave plate 56, one (1) spot of the circular polarization is formed on the disc.

The light beam of the circular polarization reflecting on the optical disc enters into the objective lens 2 and the quarter wave plate 56. In this instance, the light beam of the circular polarization is converted into a light beam of the P-polarization by the function of the quarter wave plate 56. The light beam of the P-polarization enters into the polarization diffraction grating 25. FIG. 20 is a view for showing a patter of the polarization diffraction grating 25. Herein, a point GC in FIG. 20 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY. Also, the region DX is divided into regions DX1, DX2, DX3 and DX4, wherein they have the grooves being same in pitch and direction of the grating grooves, for the regions aligned in a diagonal direction. Herein, the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $-1^{st}$ dimensional diffraction light=1:0:1. Also, the P-polarized light beam entering in the region DY transmits therethrough, or emits therefrom as the $0^{th}$ dimensional diffraction light.

The light beam emitting from the polarization diffraction grating 25, after passing through the reflection mirror 55, the beam expander 54, the collimating lens 51 and the beam expander 52, enters into a diffraction grating 11. FIG. 21 is a view for showing a pattern of the diffraction grating 11.

Herein, a dotted line in FIG. 21 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively. The diffraction grating 11 can be divided, roughly, into regions D1, D2 and D3. And, the region D2 can be divided into regions Da, Db, Dc, Dd, De, Df, Dg and Dh. Each of regions can be divided, depending on diffracted lights of the disc, and they can be divided into regions Da, Db Dc and Dd (i.e., a diffraction grating region B) where the $\pm 1^{st}$ dimensional diffraction lights of the disc enter into, regions De and Dh (i.e., a diffraction grating region A) where the $0^{th}$ dimensional diffraction light of the disc enters into, and regions Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Da, Db, Dc, Dd, De, Df, Dg or Dh. Herein, for example, it is assumed that a diffraction efficiency of the region D2 is $+1^{st}$ dimensional diffraction light: $0^{th}$ dimensional diffraction light: $-1^{st}$ dimensional diffraction light=7:0:3.

The light beam emitting from the diffraction grating 11 enters into light receiving parts of a photo detector 10. In FIG. 22 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The $+1^{st}$ dimensional diffraction light of the region DX1 and DX3 of the region DX of the polarization diffraction grating 25 enters into the light receiving part i1, and the $-1^{st}$ dimensional diffraction light enters into the light receiving part i3. And, the $+1^{st}$ dimensional diffraction light of the region DX2 and DX4 enters into the light receiving part i2, and the $-1^{st}$ dimensional diffraction light enters into the light receiving part i4. Also, the $+1^{st}$ dimensional diffraction light emitting from the region DY of the polarization diffraction grating 25 and diffracting on the regions Da, Db, Dc, Dd, De, Df, Dg and Dh of the diffraction grating 11, enters into the light receiving parts a1, b1, c1, d1, e1, f1, g1 and h1.

Also, the $-1^{st}$ dimensional diffraction light diffracting on the regions Da, Db, Dc and Dd enters into dark line portions of the light receiving parts r, s, t, u and v for use of detection of the focus error signal, and the $-1^{st}$ dimensional diffraction light diffracting on the regions De, Df, Dg and Dh enters into the light receiving parts e2, f2, g2 and h2, respectively.

The focus error signal (FES), the tracking error signal (TES) and RF signal (RF) are produced by executing the following operation upon signals A1, B1, C1, D1, E1, F1, G1, H1, E2, F2, G2, H2, R, S, T, U, V, I1, I3 and I4, which are obtained from the light receiving parts a1, b1, c1, d1, e1, f1, g1, h1, e2, f2, g2, h2, r, s, t, u, v, i1, i2, i3 and i4.

$$FES=(R+T+V)-(S+U)$$

$$TES=\{(A1+B1)-(C1+D1)\}-k\times\{(E1+E2+F1+F2)-(G1+G2+H1+H2)\}$$

$$RF=A1+B1+C1+D1+E1+F1+G1+H1+I1+I2+I3+I4 \quad \text{(Eq. 6)}$$

Also, relating to the tracking detection method, the following operation may be applied:

$$TES=\{(A1+E1+B1+F1)-(C1+G1+D1+H1)\}-k\times\{(E2+F2)-(G2+H2)\} \quad \text{(Eq. 7)}$$

Further, k is a coefficient for not generating a DC component in the tracking error signal when shifting the objective lens. Herein, a focus error detection method is a knife-edge detection method.

Figure 23A:
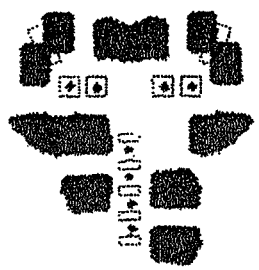
FIGS. 23A and 23B are views for showing a signal light and a stray light on the photo detector when recording/reproducing a disc having a small gap between the layers thereof, with the structure shown in the embodiment 5.
Figure 23A:
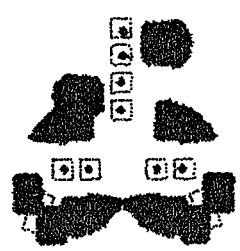
Figure 23B:
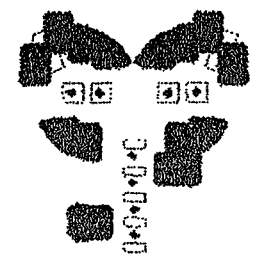
Figure 23B:
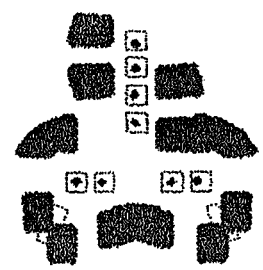

The present embodiment is characterized in that, similar to the embodiment 1 mentioned above, the diffraction gratings are disposed on a movable portion and a fixed portion, respectively. The difference from the embodiment 1 lies in the difference of the dividing method of the polarization diffraction grating 25. Herein, explanation will be given on the reason of dividing the region DX of the polarization diffraction grating 25. In case of the structure according to the embodiment 1, it is very advantageous when the gap between the disc layers is small; however, on the contrary to that, it is necessary to make the gap between the light receiving parts large, if the gap of the layers is large, between the farthest layer from the surface and the nearest layer thereto. This is because that if the gap between the farthest layer and the nearest layer from/to the surface is large, the size or area of the stray light comes to be large on the surface of the detector. For this reason, from a viewpoint of avoiding the stray light, it is necessary to position the light receiving part of the light beam diffracting on the region DX far from. On the contrary thereto, according to the present embodiment, the region DX of the polarization diffraction grating 25 is divided into four (4), thereby to detect the regions diagonally located with each other by the same light receiving part, i.e., having such structure that the stray light is generated only in the diagonal direction; therefore it is possible to avoid the stray light, similarly, even if the gap between the layers is small or large. FIG. 23A shows the signal light and the stray light of 90 μm when reproducing the position of 85 μm, and FIG. 23B shows the signal light and the stray light of 85 μm when reproducing the position of 90 μm. However, calculation is made with using the following condition:

<Calculating Condition>
wavelength; 405 nm
NA; 0.85
Detecting magnification; 20 times From this result, it can be seen that, by dividing the region DX of the polarization diffraction grating 25 into four (4), and forming the grating grooves with the same pitch and the same direction between the regions diagonally located with each other, it is possible to avoid the stray light. Also, when the gap between the farthest layer and the nearest layer from the surface becomes large with this structure, since this only result to enlarge the size or area of the stray light, therefore it can be seen that the stray light does not enter into other light receiving part(s). And, with shifting the polarization diffraction grating 25 together with the objective lens, because no movement occurs in the position of the objective lens, it is possible to avoid the stray light irrespective of the shifting of the objective lens. Also, the light beam emitting on the region DY of the polarization diffraction grating 25 is detected, as is shown in FIGS. 23A and 23B; i.e., the light beams emitting on the regions Da, Db, Dc and Dd by the diffraction grating 11 are detected by the detecting parts, which are aligned in the Tan direction, and the light beams emitting from the regions De, Df, Dg and Dh are detected by the detecting parts, which are aligned in the Rad direction, respectively. With this, it is possible to avoid the stray light, with high efficiency.

For this reason, with applying the structure of using two (2) sets of diffraction gratings, it is possible to miniaturize the photo detector 10, while avoiding the stray light. Herein, although the stray light(s) from other layer(s) enter(s) into the light receiving parts i1, i2, i3 and i4, however one of them can be detected as an influential tracking error signal, and therefore no practical problem is produced therefrom.

As was mentioned above, with applying the structure of using two (2) sets of diffraction gratings therein, it is possible to detect the stable focus error signal and tracking error signal even with the multi-layer optical disc.

However, according to the present embodiment, although the diffraction grating 11 is disposed after transmitting the beam splitter; but the similar effect can be obtained if disposing it before transmitting the beam splitter while replacing the diffraction grating 11 by the polarization diffraction grating. Also, the diffraction efficiencies of the polarization diffraction grating 25 and the diffraction grating 11 are only the examples; but the diffraction efficiencies of the regions DX1, DX2, DX3 and DX4 of the region DX of the polarization diffraction grating 25 may be determined, the $+1^{st}$ dimensional diffraction light: the $0^{th}$ dimensional diffraction light: $-1^{st}$ dimensional diffraction light=0:0:1. In this instance, the diffraction grating 11 may be two (2) regions D1 and D2. Also, the diffraction efficiency of the region D2 of the diffraction grating 11 may be determined, the $+1^{st}$ dimensional diffraction light: the $0^{th}$ dimensional diffraction light: $-1^{st}$ dimensional diffraction light=1:0:1. Further, according to the present embodiment, although detection is made upon transmission through the regions D1 and D3 of the diffraction grating 11 or as the $0^{th}$ dimensional diffraction light; however, not limited to this, for example, from a viewpoint of reducing the detector to be small, the region DX of the polarization diffraction grating 25 may be brought to be close to the light receiving parts of the $\pm 1^{st}$ dimensional lights themselves, by setting the diffraction efficiency of the region D1 of the diffraction grating 11, $+1^{st}$ dimensional diffraction light: $0^{th}$ diffraction light: $-1^{st}$ dimensional diffraction light=1:0:0, and setting the diffraction efficiency of D3, $+1^{st}$ dimensional diffraction light: $0^{th}$ dimensional diffraction light: $-1^{st}$ dimensional diffraction light=0:0:1.

Figure 24:
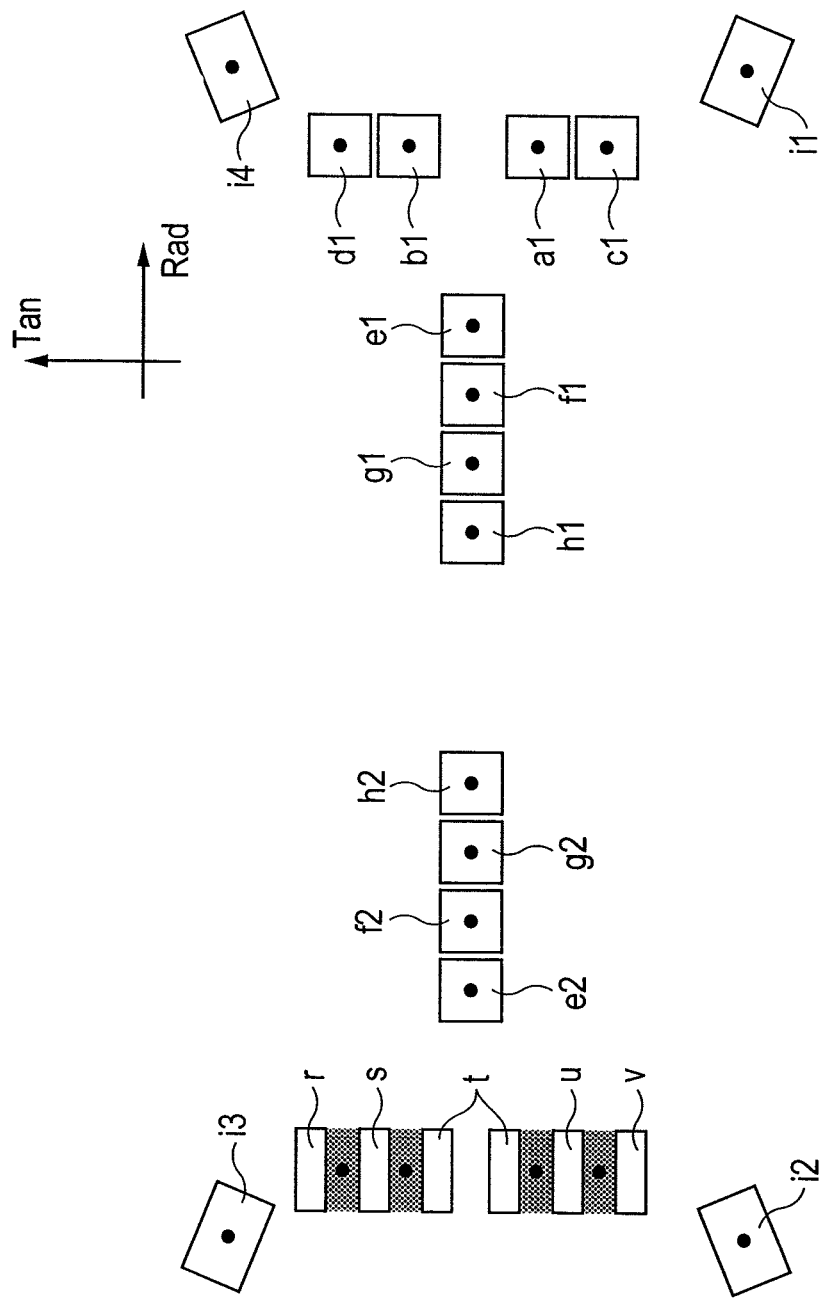
FIG. 24 is a view for showing another arrangement of light receiving parts of the photo detector according to the embodiment 5.

Also, the arrangement of the light receiving parts according to the present embodiment is an example, and the similar effect can be obtained with the arrangement of the light receiving parts as shown in FIG. 24, for example. Also, as in the embodiment 3 or the embodiment 4, the focus error signal may be detected through a spot size detection method, with adding a defocus aberration to the light beam diffracting on the region DX of the polarization diffraction grating. Also, it is not always necessary that the regions DX1 and DX3 or DX2 and DX4 of the polarization diffraction grating 25 have the same pitch and the same direction of the grating grooves, but for example, they may be separated one by one in the diffraction direction, for example. Further, the region DX of the polarization diffraction grating 25 should not be limited to 4-division. For example, in case where the stray light can be limited to, such as, that from the disc surface, etc., since the direction of the stray light can be limited, the region can be divided into two (2) from a viewpoint of avoiding such stray light.

Further, the shape of the light receiving part should not be a square, but may be an oblong or a circle or an ellipse. And, from a viewpoint of a number of output pins and S/N, the light receiving parts are connected with lines.

Embodiment 6

Figure 25:
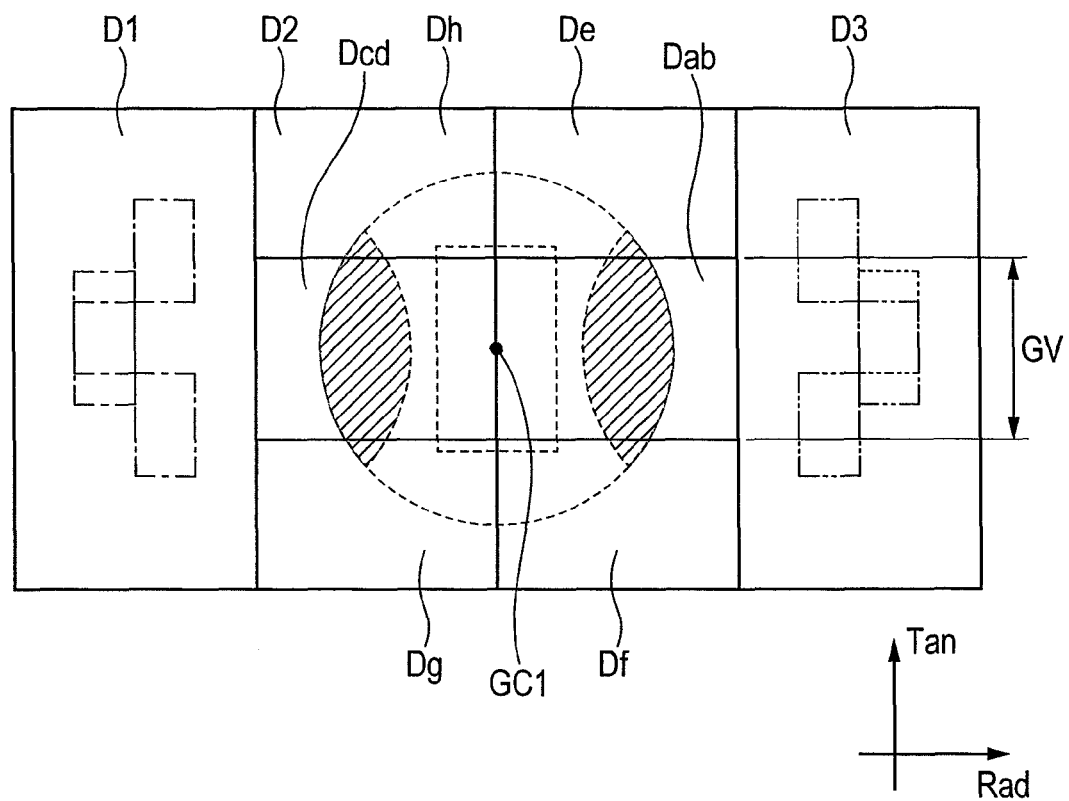
FIG. 25 is a view for showing a relationship between a pattern of a diffraction grating and a light beam on the diffraction grating according to an embodiment 6.
Figure 26:
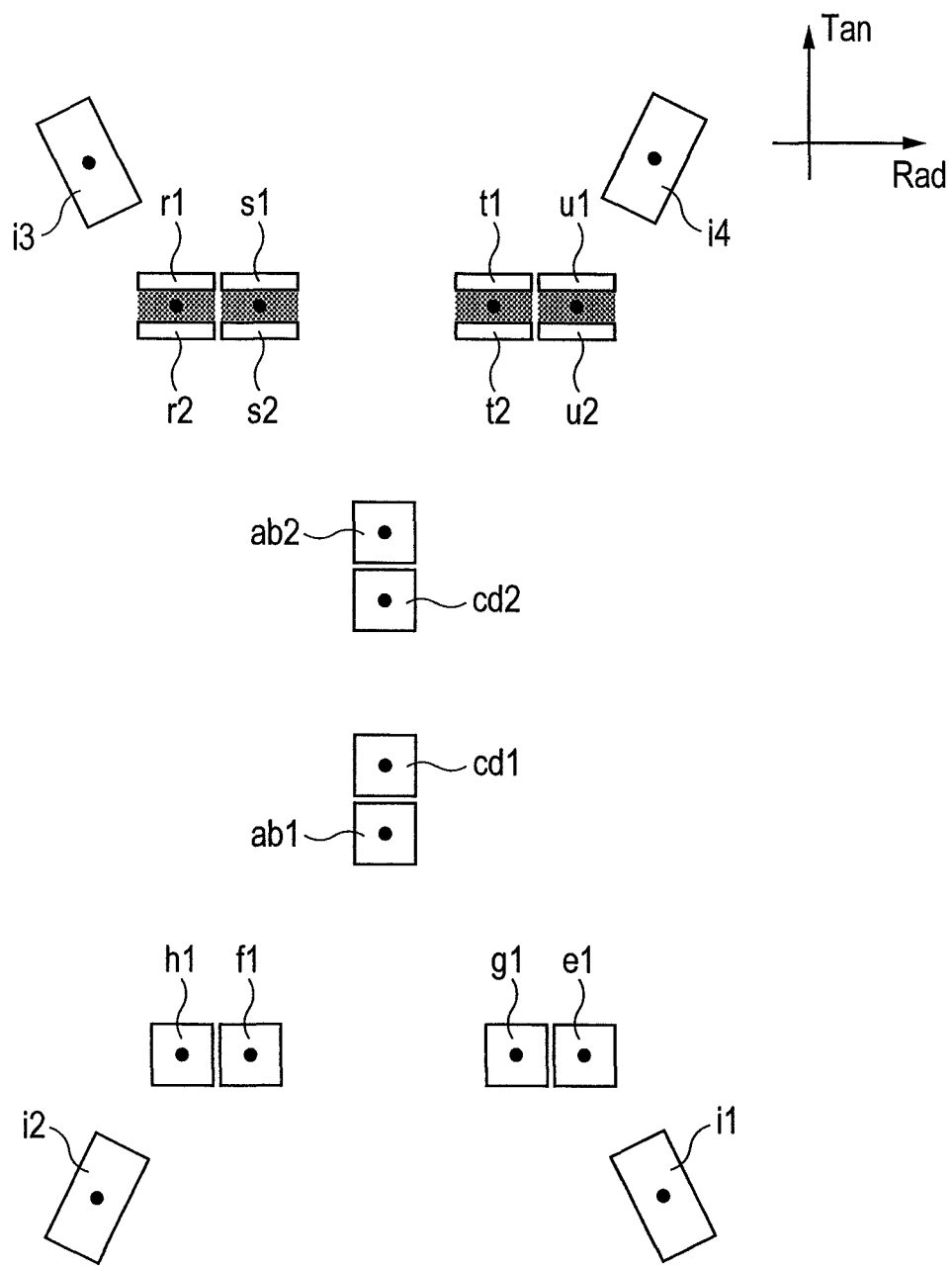
FIG. 26 is a view for showing an arrangement of light receiving parts of a photo detector according to an embodiment 6.

FIGS. 25 and 26 are views for showing the light receiving parts of the diffraction grating 11 and the photo detector 10 of the optical pickup device, according to a sixth embodiment of the present invention. Difference between the embodiment 1 lies in that the patterns of the polarization diffraction grating 25 and the diffraction grating 11, and the light receiving parts of the photo detector 10 differ from, but other than that are similar to those of the embodiment 1, in the structures thereof.

Similar to FIG. 1 of the embodiment 1, from the laser diode 50 is emitted the light beam of P-polarization, having wavelength of about 405 nm, as the diverging light. The light beam of the P-polarization emitting from the laser diode 50 is converted into a light beam of S-polarization on a half wave plate. The light beam of the S-polarization is reflected on a polarization beam splitter 52. The light beam reflecting on the polarization beam splitter 52 is converted into nearly parallel light beams by the collimating lens 51. The light beams transmitting through the collimating lens 51 enter into a beam expander 54. The beam expander 54 is used for compensating the spherical aberration due to an error in thickness of a cover lay in thickness of a cover lay of the optical disc, by changing the diverging/converging condition of the light beam. The light beams emitting from the beam expander 54 are reflected on the reflection mirror 55, and after passing through the polarization diffraction grating 25, the quarter wave plate 56 and the objective lens 2, which are mounted on the actuator 5, they are focused on the optical disc. In this instance, the polarization diffraction grating 25 has the structure of causing the diffracting function upon the light beam of P-polarization, but not causing the diffracting function upon the light beam of S-polarization. Also, since the light beam of S-polarization is emitted in the form of the light beam of circular polarization by the function of the quarter wave plate 56, one (1) spot of the circular polarization is formed on the disc.

The light beam of the circular polarization reflecting on the optical disc enters into the objective lens 2 and the quarter wave plate 56. In this instance, the light beam of the circular polarization is converted into a light beam of the P-polarization by the function of the quarter wave plate 56. The light beam of the P-polarization enters into the polarization diffraction grating 25. FIG. 20 is a view for showing a patter of the polarization diffraction grating 25. Herein, a point GC in FIG. 20 depicts a center of the light beam entering into the polarization diffraction grating, and a dotted line RO1 depicts an outer configuration of the light beam on the polarization diffraction grating 25. Also, a region where slanting lines are treated depicts an interfering region between the light beam diffracted by the optical disc. The polarization diffraction grating 25 is divided into a region DX and a region DY. Also, the region DX is divided into regions DX1, DX2, DX3 and DX4, wherein they have the grooves being same in pitch and direction of the grating grooves, for the regions aligned in a diagonal direction. Herein, the P-polarized light beam entering into the region DX is diffracted as $\pm 1^{st}$ dimensional diffraction lights. Herein, for example, it is assumed that a diffraction efficiency of the region DX is $+1^{st}$ dimensional diffraction light: $0^{th}$ dimensional diffraction light: $-1^{st}$ dimensional diffraction light=1:0:1. Also, the P-polarized light beam entering in the region DY transmits therethrough, or emits therefrom as the $0^{th}$ dimensional diffraction light.

The light beam emitting from the polarization diffraction grating 25, after passing through the reflection mirror 55, the beam expander 54, the collimating lens 51 and the beam expander 52, enters into a diffraction grating 11. FIG. 25 is a view for showing a pattern of the diffraction grating 11. Herein, a dotted line in FIG. 25 depicts the light beam, which transmits through the region DY of the polarization diffraction grating 25 or emits therefrom as the $0^{th}$ dimensional diffraction light, a point GC1 depicts a center of that light beam, a one-dotted chain line depicts the $+1^{st}$ dimensional diffraction light in the region DX of the polarization diffraction grating 25, and a two-dotted chain line depicts the $-1^{st}$ dimensional diffraction light in the region DX of the polarization diffraction grating, respectively.

The diffraction grating 11 can be divided, roughly, into regions D1, D2 and D3. And, the region D2 can be divided into regions Dab, Dcd, De, Df, Dg and Dh. Each of regions can be divided, depending on diffracted lights of the disc, and they can be divided into regions Dab and Dcd (i.e., a diffraction grating region B) where the ±$1^{st}$ dimensional diffraction lights of the disc enter into, regions De and Dh (i.e., a diffraction grating region A) where the $0^{th}$ dimensional diffraction light of the disc enters into, and regions Df and Dg (i.e., a diffraction grating region C) where the $0^{th}$ dimensional diffraction light of the disc enters into.

Herein, the light beam entering into the regions D1 and D3 transmits therethrough or emits therefrom as the $0^{th}$ dimensional diffraction light. With this, it can be seen that the light beam diffracting on the region DX of the polarization diffraction grating 25 transmits or passes through the diffraction grating 11, as it is. Also, the light beam entering into the region D2 is diffracted depending on a pitch and a direction of gutters of the grating of the region Dab, Dcd, De, Df, Dg or Dh. Herein, for example, it is assumed that a diffraction efficiency of the region D2 is +$1^{st}$ dimensional diffraction light: $0^{th}$ dimensional diffraction light: −$1^{st}$ dimensional diffraction light=7:0:3.

The light beam emitting from the diffraction grating 11 enters into light receiving parts of a photo detector 10. In FIG. 26 is shown an arrangement of the light receiving parts of the photo detector 10 and a signal light. On the photo detector 10 are disposed plural numbers of light receiving parts, and upon each of light receiving parts is irradiated the light beam divided by the diffraction grating 11. The +$1^{st}$ dimensional diffraction light of the region DX1 and DX3 of the region DX of the polarization diffraction grating 25 enters into the light receiving part i1, and the −$1^{st}$ dimensional diffraction light enters into the light receiving part i3. And, the +$1^{st}$ dimensional diffraction light of the region DX2 and DX4 enters into the light receiving part i2, and the −$1^{st}$ dimensional diffraction light enters into the light receiving part i4. Also, the +$1^{st}$ dimensional diffraction light emitting from the region DY of the polarization diffraction grating 25 and diffracting on the regions Dab, Dcd, De, Df, Dg and Dh of the diffraction grating 11 enters into the light receiving parts ab1, cd1, e1, f1, g1 and h1.

Also, the −$1^{st}$ dimensional diffraction light diffracting on the regions Dab and Dcd enters into the light receiving parts ab2 and cd2, and the −$1^{st}$ dimensional diffraction light diffracting on the regions De, Df, Dg and Dh enters into dark line portions of the light receiving parts r1, r2, s1, s2, t1, t2, u1 and u2, respectively.

The focus error signal (FES), the tracking error signal (TES) and RF signal (RF) are produced by executing the following operation upon signals AB1, CD1, E1, F1, G1, H1, AB2, CD2, R1, R2, S1, S2, T1, T2, U1, U2, I1, I2, I3 and I4, which are obtained from the light receiving parts ab1, cd1, e1, f1, g1, h1, ab2, cd2, r1, r2, s1, s2, t1, t2, u1, u2, i1, i2, i3 and i4.

$$FES=(R1+S2+T2+U1)-(R2+S1+T1+U2)$$

$$TES=\{(AB1+AB2)-(CD1+CD2)\}-k\times\{(E1+F1)-(G1+H1)\}$$

$$RF=AB1+AB2+CD1+CD2+E1+F1+G1+H1+I1+I2+I3+I4 \quad \text{(Eq. 8)}$$

Further, k is a coefficient for not generating a DC component in the tracking error signal when shifting the objective lens. Herein, a focus error detection method is a knife-edge detection method.

The present embodiment is characterized in that, similar to the embodiment 1 mentioned above, the diffraction gratings are disposed on a movable portion and a fixed portion, respectively. Differences from the embodiment 1 lie in the difference of the divided regions, i.e., the regions Dab and Dcd of the diffraction grating 11, and also in the dividing method of the polarization diffraction grating 25.

Although being divided into the regions Da and Db, and the regions Dc and Dd in the embodiment 1; however, in the present embodiment, the region is divided into the region Dab and Dcd. Further, with detecting the light beam diffracting on the regions Dab and Dcd by two (2) light receiving parts, respectively, i.e., reducing the number of the light receiving parts, it is possible to miniaturized the detector to be small than that of the embodiment 1. And, similar to an embodiment 5, i.e., dividing the region DX of the polarization diffraction grating 25 into four (4) and detecting the regions diagonally located with each other by the same light receiving part, and thereby achieving the structure of generating no stray light in the diagonal direction; it is possible to avoid the stray light, similarly, even if the gap between the layers is small. Also, because of shifting of the polarization diffraction grating 25 together with the objective lens, no movement of the stray light occurs if the position of the objective lens is shifted; therefore it is possible to avoid the stray light irrespective of shifting of the objective lens. And, the light beam emitting on the region DY of the polarization diffraction grating 25 is detected, as is shown in FIG. 26; i.e., the light beams emitting on the regions Dab and Dcd by the diffraction grating 11 are detected by the detecting parts, which are aligned in the Tan direction, and the light beams emitting from the regions De, Df, Dg and Dh are detected by the detecting parts, which are aligned in the Rad direction, respectively. With this, it is possible to avoid the stray light, with high efficiency.

For this reason, with applying the structure of using two (2) sets of diffraction gratings, it is possible to miniaturize the photo detector 10, while avoiding the stray light. Herein, although the stray light(s) from other layer(s) enter(s) into the light receiving parts i1, i2, i3 and i4, however one of them can be detected as an influential tracking error signal, and therefore no practical problem is produced therefrom.

As was mentioned above, with applying the structure of using two (2) sets of diffraction gratings therein, it is possible to detect the stable focus error signal and tracking error signal even with the multi-layer optical disc.

However, according to the present embodiment, although the diffraction grating 11 is disposed after transmitting the beam splitter; but the similar effect can be obtained if disposing it before transmitting the beam splitter while replacing the diffraction grating 11 by the polarization diffraction grating. Also, the diffraction efficiencies of the polarization diffraction grating 25 and the diffraction grating 11 are only the examples; but the diffraction efficiencies of the regions DX1, DX2, DX3 and DX4 of the region DX of the polarization diffraction grating 25 may be determined, the +$1^{st}$ dimensional diffraction light: the $0^{th}$ dimensional diffraction light: −$1^{st}$ dimensional diffraction light=0:0:1. In this instance, the diffraction grating 11 may be two (2) regions D1 and D2. Also, the diffraction efficiency of the region D2 of the diffraction grating 11 may be determined, the +$1^{st}$ dimensional diffraction light: the $0^{th}$ dimensional diffraction light: −$1^{st}$ dimensional diffraction light=1:0:1. Further, according to the present embodiment, although detection is made upon transmission through the regions D1 and D3 of the diffraction grating 11 or as the $0^{th}$ dimensional diffraction light; however, not limited to this, for example, from a viewpoint of reducing the detector to be small, the region DX of the polarization diffraction grating 25 may be brought to be close to the light receiving parts of the ±$1^{st}$ dimensional lights themselves, by setting the diffraction efficiency of the region D1 of the diffraction grating 11, +$1^{st}$ dimensional diffraction light: $0^{th}$ diffraction light: −$1^{st}$ dimensional diffraction light=1:0:0, and setting the diffraction efficiency of D3, +$1^{st}$ dimensional diffraction light: $0^{th}$ dimensional diffraction light: −$1^{st}$ dimensional diffraction light=0:0:1.

Also, as in the embodiment 3 or the embodiment 4, the focus error signal may be detected through a spot size detection method, with adding a defocus aberration to the light beam diffracting on the region DX of the polarization diffraction grating. Also, it is not always necessary that the regions DX1 and DX3 or DX2 and DX4 of the polarization diffraction grating 25 have the same pitch and the same direction of the grating grooves, but for example, they may be separated one by one in the diffraction direction, for example. Further, the region DX of the polarization diffraction grating 25 should not be limited to 4-division. For example, in case where the stray light can be limited to, such as, that from the disc surface, etc., since the direction of the stray light can be limited, the region can be divided into two (2) from a viewpoint of avoiding such stray light.

Further, the shape of the light receiving part should not be a square, but may be an oblong or a circle or an ellipse. And, from a viewpoint of a number of output pins and S/N, the light receiving parts are connected with lines.

Embodiment 7

Figure 27:
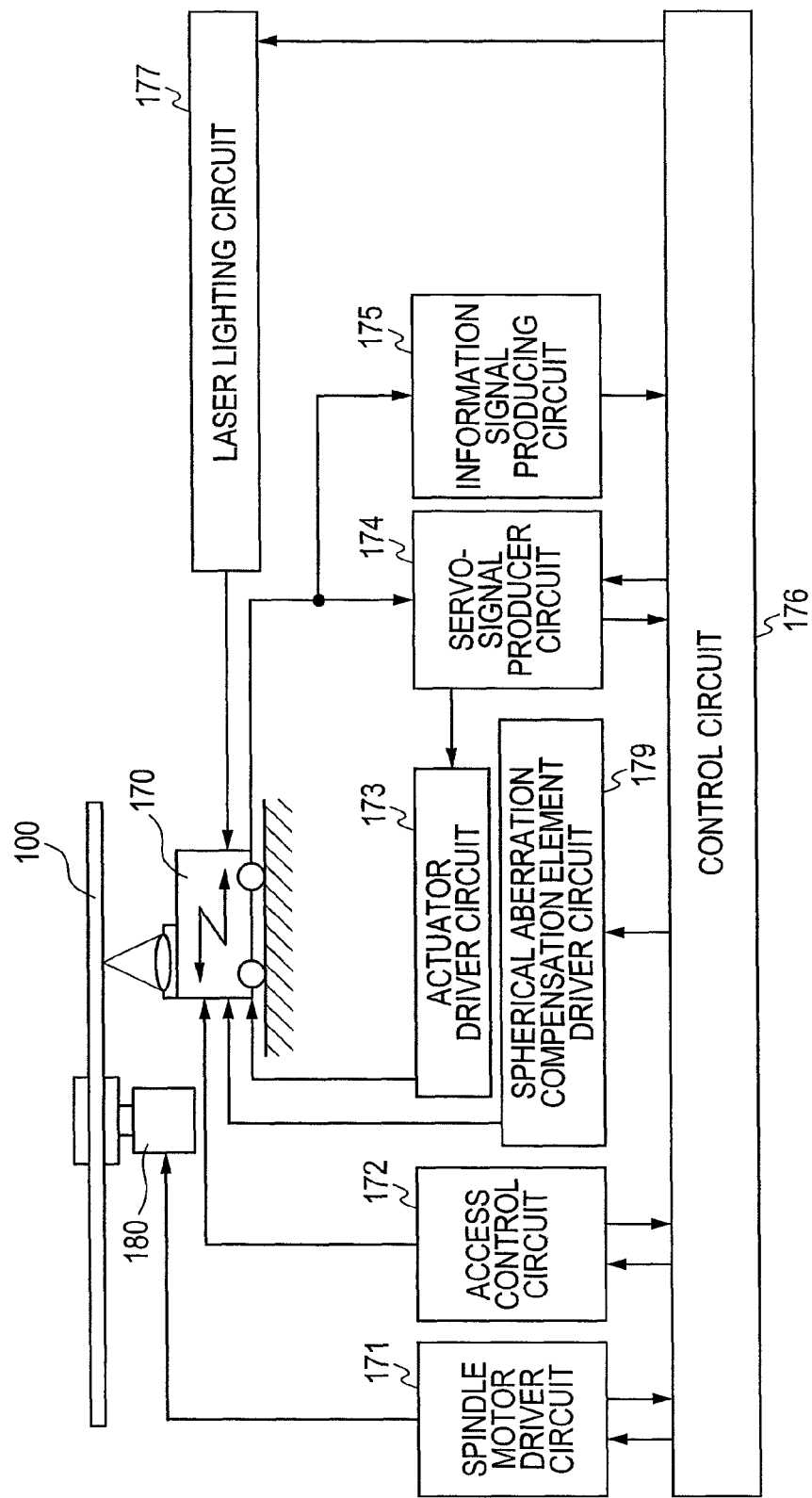
FIG. 27 is a view for explaining an optical reproducing apparatus according to an embodiment 7.

With an embodiment 7, explanation will be given on an optical recording apparatus, which mounts the optical pickup device 170 thereon. FIG. 27 shows an outline structure of the optical recording apparatus. On the optical pickup device 170 is provided a mechanism to be driven along the Rad direction of an optical disc 100, and the position of which is controlled depending on an access control signal from an access controller circuit 172.

From a laser lighting circuit 177, a predetermined laser dive current is supplied to a laser diode within the optical pickup device 170, and from the laser diode is emitted a laser light of a predetermined light amount or volume thereof, depending on reproduction. Further, the laser lighting circuit 177 can be installed within the optical pickup device 170.

A signal outputted from the photo detector 10 within the optical pickup device 170 is transmitted to a servo signal producer circuit 174 and an information signal reproducing circuit 175. In the servo signal producer circuit 174 are produced servo signals, such as, the focus error signal, the tracking error signal and a tilt control signal, etc., for example, upon basis of signals from the photo detector 10, and upon basis of this, position control of the objective lens is executed with driving an actuator(s) within the optical pickup device 170 through an actuator driver circuit 173.

In the information signal reproducing circuit 175 mentioned above, an information signal recorded on the optical disc 100 is reproduced upon basis of the signals from the optical detector 10 mentioned above.

Apart of the signals obtained in the servo signal producer circuit 174 and the information signal reproducing circuit 175 mentioned above are transmitted to a control circuit 176. With this control circuits are connected a spindle motor driver circuit 171, an access controller circuit 172, the servo signal producer circuit 174, the servo signal producer circuit 174, a spherical aberration compensation element driver circuit 179, etc., and thereby conducting a rotation control of a spindle motor 180 for rotating the optical disc 100, a control on access direction and access position, a servo-control of the objective lens, a control of an amount of light emitted from the laser diode, compensation of the spherical aberration due to the difference in thickness of a disc substrate, etc.

Embodiment 8

Figure 28:
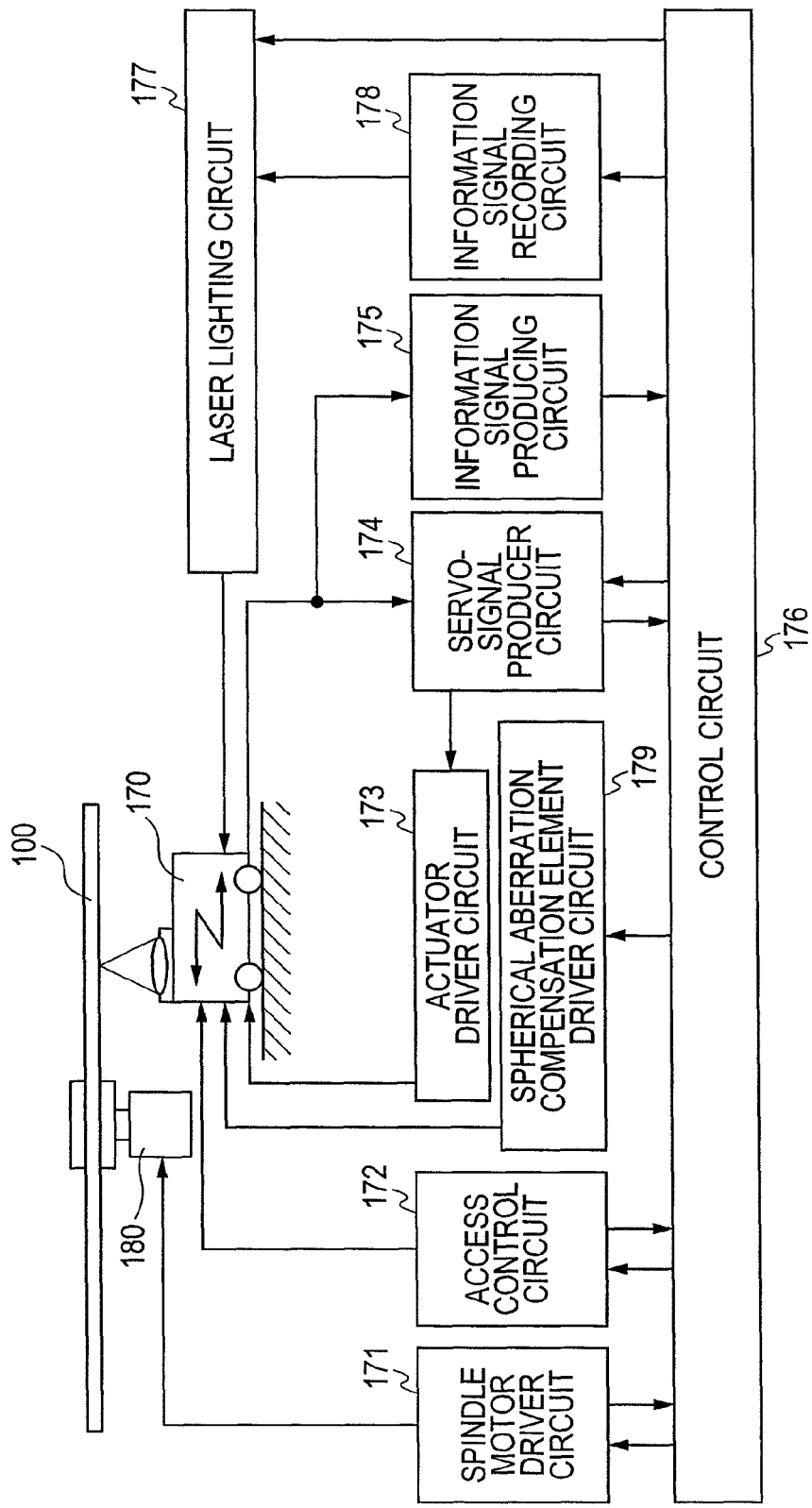
FIG. 28 is a view for explaining an optical recording/reproducing apparatus, according to an embodiment 8.

With an embodiment 8, explanation will be given on an optical recording/reproducing apparatus, mounting the optical pickup device thereon. FIG. 28 shows an outline structure of the optical recording/reproducing apparatus. An aspect of this apparatus differing from the optical information reproducing apparatus lies in that there are provided an information signal recording circuit 178 between the control circuit 176 and the laser lighting circuit 177, and upon basis of a recording control signal from the information signal recording circuit 178, the lighting control of the laser lighting circuit 177 is executed.

However, the present invention should not be restricted to the embodiments mentioned above, but various embodiments may be included therein. For example, the embodiments mentioned above are mentioned in details thereof, for the purpose of easy understanding of the present invention; but the present invention should not be limited, necessarily, only to that including all of the constituent elements, which are explained in the above. Also, it is possible to replace a part(s) of the constituent elements of a certain embodiment by a constituent element(s) of other embodiment, or to add a constituent element(s) of other embodiment to the constituent elements of a certain embodiment. Also, with a part of the constituent elements of each embodiment, it can be added, deleted and/or replaced by that of other embodiment(s).

What is claimed is:

1. An optical pickup device, comprising:
a laser diode, which emits a laser light therefrom;
an objective lens, which is configured to irradiate the light beam emitting from said laser diode upon an optical disc;
an actuator, which is configured to drive said objective lens;
at least two (2) diffraction gratings, including first and second diffraction gratings for dividing the light beam reflecting on an information recording layer of said optical disc; and
a photo detector including plural numbers of light receiving parts, which are configured to detect the light beams dividing from said first diffraction grating and said second diffraction grating, wherein
said first diffraction grating is mounted on a movable portion of said actuator,
said first diffraction grating is divided into at least a first region including an optical axis of the light beam incident upon said diffraction grating, and a second region other than that,
the light beam incident upon said first region of said first diffraction grating is diffracted, and said light beam diffracted passes through said second diffraction grating, so that said light beam passing therethrough is detected by said photo detector,
said second diffraction grating is divided into at least two (2) regions, including at least a first and second region having characteristics different from each other,
the first region of said second diffraction grating transmits through the light beam entering thereon or emits a $0^{th}$ dimensional diffraction light therefrom, and
the second region of said second diffraction grating diffracts the light beam entering thereon;
the second region of said second diffraction grating has three (3) regions, including a diffraction grating region A, a diffraction grating region B and a diffraction grating region C, and
among disc diffraction lights diffracted by a track on said optical discs,
the 0th dimensional diffraction light enters into said diffraction grating region A and said diffraction grating region C,
at least ±1st dimensional diffraction light enters into said diffraction grating region B, and
said diffraction grating region B is put between said diffraction grating region A and said diffraction grating region C.

2. The optical pickup device, as described in the claim 1, wherein
said first diffraction grating is divided into a first region including an optical axis of the light beam entering into said diffraction grating, and a second region other than that, and
a first light beam passing through said first region and a second light beam passing through said second region differ from each other in traveling directions thereof.

3. The optical pickup device, as described in the claim 2, wherein
said second light beam transmits through said second diffraction grating or emits as a 0th dimensional diffraction light.

4. The optical pickup device, as described in the claim 2, wherein
the traveling direction of said first light beam is changed to at least the first diffraction grating between the first and second diffraction gratings, and
the traveling direction of said second light beam is changed only to the first diffraction grating between the first and second diffraction gratings.

5. The optical pickup device, as described in the claim 2, wherein
the light receiving part for detecting the light beam diffracting on the first region of said first diffraction grating has a length in a direction nearly parallel with a direction of diffraction on said first region, being larger than a length in a direction perpendicular thereto.

6. The optical pickup device, as described in the claim 2, wherein
the first region of said first diffraction region is divided into four (4) by two (2) pieces of division lines, being perpendicular to each other, and a pitch of grooves and a direction of grooves of gratings in the regions, not neighboring with each other, is nearly equal to.

7. The optical pickup device, as described in the claim 1, wherein
a focus error signal of a knife-edge detection method is produced from the light beam diffracting on said second diffraction grating.

8. The optical pickup device, as described in the claim 1, wherein
a focus error signal of a spot-size detection method is produced from the light beam diffracting on said first diffraction grating.

9. The optical pickup device, as described in the claim 1, wherein
a tracking error signal is produced from the light beam diffracting on said second diffraction grating.

10. The optical pickup device, as described in the claim 1, wherein
said second diffraction grating is divided into three (3) regions, including a first region, a second region and a third region having characteristics different from one another,
the first region or the third region of said second diffraction grating transmits through the light beam entering thereon or emits it as a 0th dimensional diffraction light therefrom, and
the second region of said second diffraction grating diffracts the light beam entering thereon.

11. The optical pickup device, as described in the claim 1, wherein
width of said diffraction grating in a disc tangential direction to an effective diameter of the light beam, which enters into the second region of said second diffraction grating is smaller than
width of said first diffraction grating region to the light beam on said first diffraction grating.

12. The optical pickup device, as described in the claim 1, wherein
the light receiving parts of said photo detector for detecting a +1st dimensional grating diffraction light or a −1st dimensional grating diffraction light of the diffraction grating region A and the diffraction grating region C of the second region of said second diffraction grating are aligned on a line, approximately, in a direction coincident with a radial direction of said optical disc.

13. The optical pickup device, as described in the claim 1, wherein
the light receiving parts of said photo detector for detecting a +1st dimensional grating diffraction light or a −1st dimensional grating diffraction light of the diffraction grating region B of the second region of said second diffraction grating are aligned on a line, approximately, in a direction coincident with a tangential direction of said optical disc.

14. The optical pickup device, as described in the claim 1, wherein
the plural numbers of detector parts on said photo detector for detecting a diffraction light of the second region of said second diffraction grating are aligned in a shape of "I".

15. The optical pickup device, as described in the claim 1, wherein
the plural numbers of detector parts on said photo detector for detecting a diffraction light of the second region of said second diffraction grating are aligned in a shape of "H".

16. The optical pickup device, as described in the claim 1, wherein
the plural numbers of detector parts on said photo detector for detecting a diffraction light of the second region of said second diffraction grating are aligned in a shape of "T".

17. The optical pickup device, as described in the claim 1, wherein
an amount of diffraction lights of the light beam diffracting on the first region of said first diffraction grating has a diffraction light includes a −1st dimensional grating diffraction light and a +1st dimensional grating diffraction light, in nearly equal to, or the −1st dimensional grating diffraction light for almost of all thereof, or the +1st dimensional grating diffraction light for almost of all thereof.

18. The optical pickup device, as described in the claim 1, wherein
an amount of diffraction lights of the light beam diffracting on the second region of said second diffraction grating has a diffraction light includes a −1st dimensional grating diffraction light and a +1st dimensional grating diffraction light, in nearly equal to, or the −1st dimensional grating diffraction light for almost of all thereof, or the +1st dimensional grating diffraction light for almost of all thereof.

19. The optical pickup device, as described in the claim 1, wherein
the first region of said first diffraction grating is a polarization diffraction grating.

20. The optical pickup device, as described in the claim 1, wherein
the first region of said first diffraction grating is a holographic diffraction grating.

21. An optical disc apparatus, comprising:
an optical pickup device, which is described in the claim 1;
a laser lighting circuit, which is configured to drive said laser diode within said optical pickup device;
a servo-signal producing circuit, which is configured to produce a focus error signal and a tracking error signal with using signals detected by said photo detector within said optical pickup device; and an information signal reproducing circuit, which is configured to reproduce an information signal recorded on the optical disc.

* * * * *